(12) United States Patent
Boyer et al.

(10) Patent No.: US 6,553,779 B1
(45) Date of Patent: Apr. 29, 2003

(54) VALVE AND DOOR ASSEMBLY FOR SEMI-FROZEN FOOD DISPENSING MACHINE

(75) Inventors: George Boyer, Rockton, IL (US); Michael Meserole, Janesville, WI (US); Ronald J. Mrugala, Ham Lake, MI (US)

(73) Assignee: Specialty Equipment Companies, Inc., Aurora, IL (US)

( * ) Notice: Subject to any disclaimer, the term of this patent is extended or adjusted under 35 U.S.C. 154(b) by 0 days.

(21) Appl. No.: 10/031,643

(22) PCT Filed: May 19, 2000

(86) PCT No.: PCT/US00/14035

§ 371 (c)(1),
(2), (4) Date: Nov. 2, 2002

(87) PCT Pub. No.: WO00/70963

PCT Pub. Date: Nov. 30, 2000

Related U.S. Application Data

(60) Provisional application No. 60/135,063, filed on May 20, 1999.

(51) Int. Cl.⁷ .................................................. A23G 9/16
(52) U.S. Cl. ..................... 62/342; 222/146.6; 251/335.2
(58) Field of Search ........................ 62/342; 222/146.6, 222/509, 518; 251/335.2

(56) References Cited

U.S. PATENT DOCUMENTS

| | | | | |
|---|---|---|---|---|
| 2,754,664 A | * | 7/1956 | Oltz ............................ 137/377 |
| 3,698,206 A | * | 10/1972 | Werner ....................... 222/559 |
| 4,711,376 A | * | 12/1987 | Manfroni .................. 222/146.1 |
| 5,016,446 A | * | 5/1991 | Fiedler ..................... 222/146.6 |
| 5,419,150 A | * | 5/1995 | Kaiser et al. ................. 62/342 |
| 5,463,877 A | * | 11/1995 | Young et al. ............ 222/146.6 |
| 5,706,720 A | * | 1/1998 | Goch et al. ................. 366/149 |
| 5,771,924 A | * | 6/1998 | Huygen ....................... 137/522 |

* cited by examiner

Primary Examiner—William E. Tapolcai
(74) Attorney, Agent, or Firm—Sonnenschein Nath & Rosenthal

(57) ABSTRACT

A softserve product refrigeration and dispensing machine (1) having numerous novel features, including a novel door (80) and product dispensing apparatus (60) having features to inhibit condensation and to provide a product dispenser design which may be easily flushed with no retention of food stuffs and the like and configured to require minimal lubrication. The novel door assembly allows for sealing of the freezing chamber (17).

20 Claims, 22 Drawing Sheets

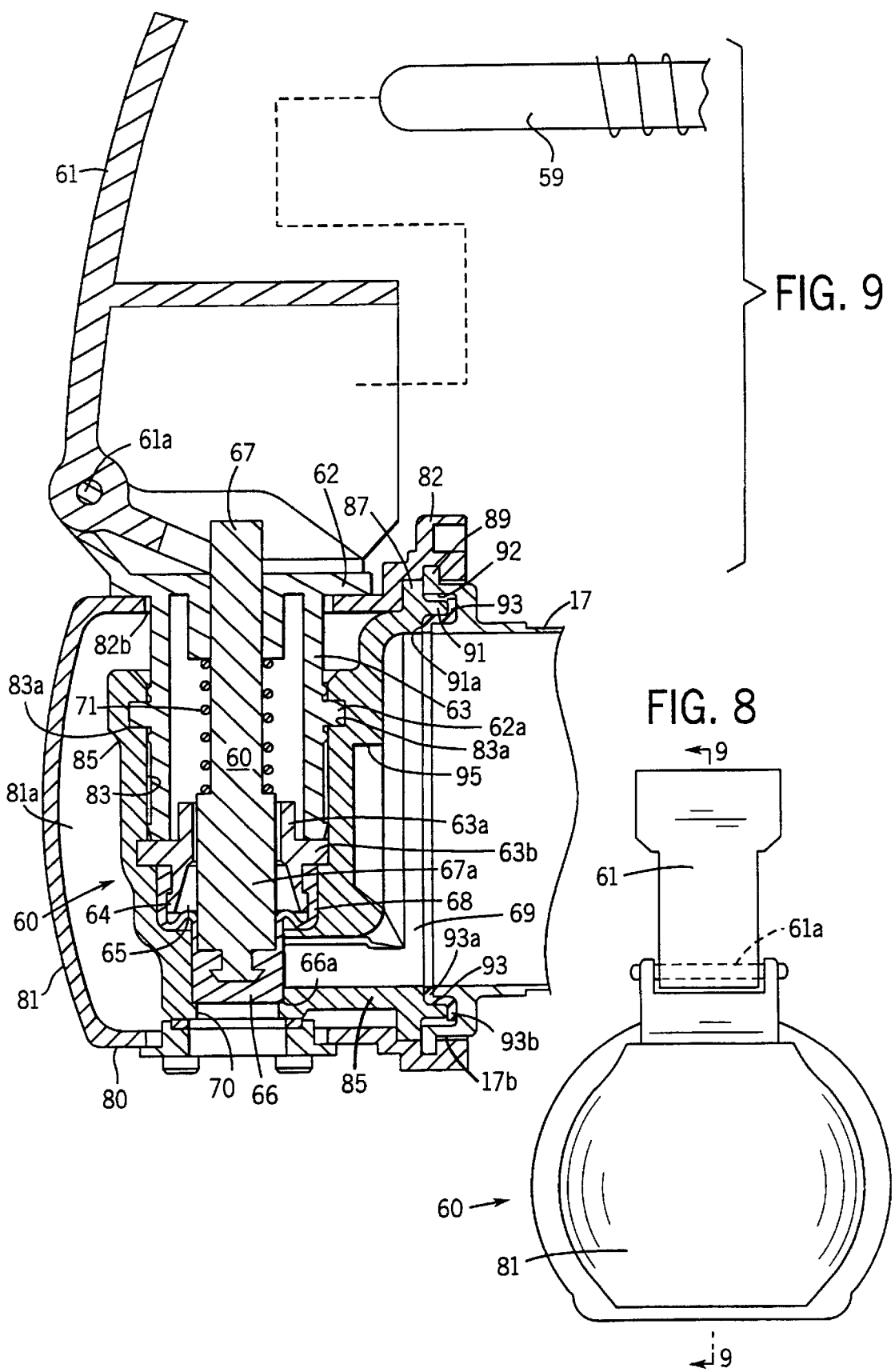

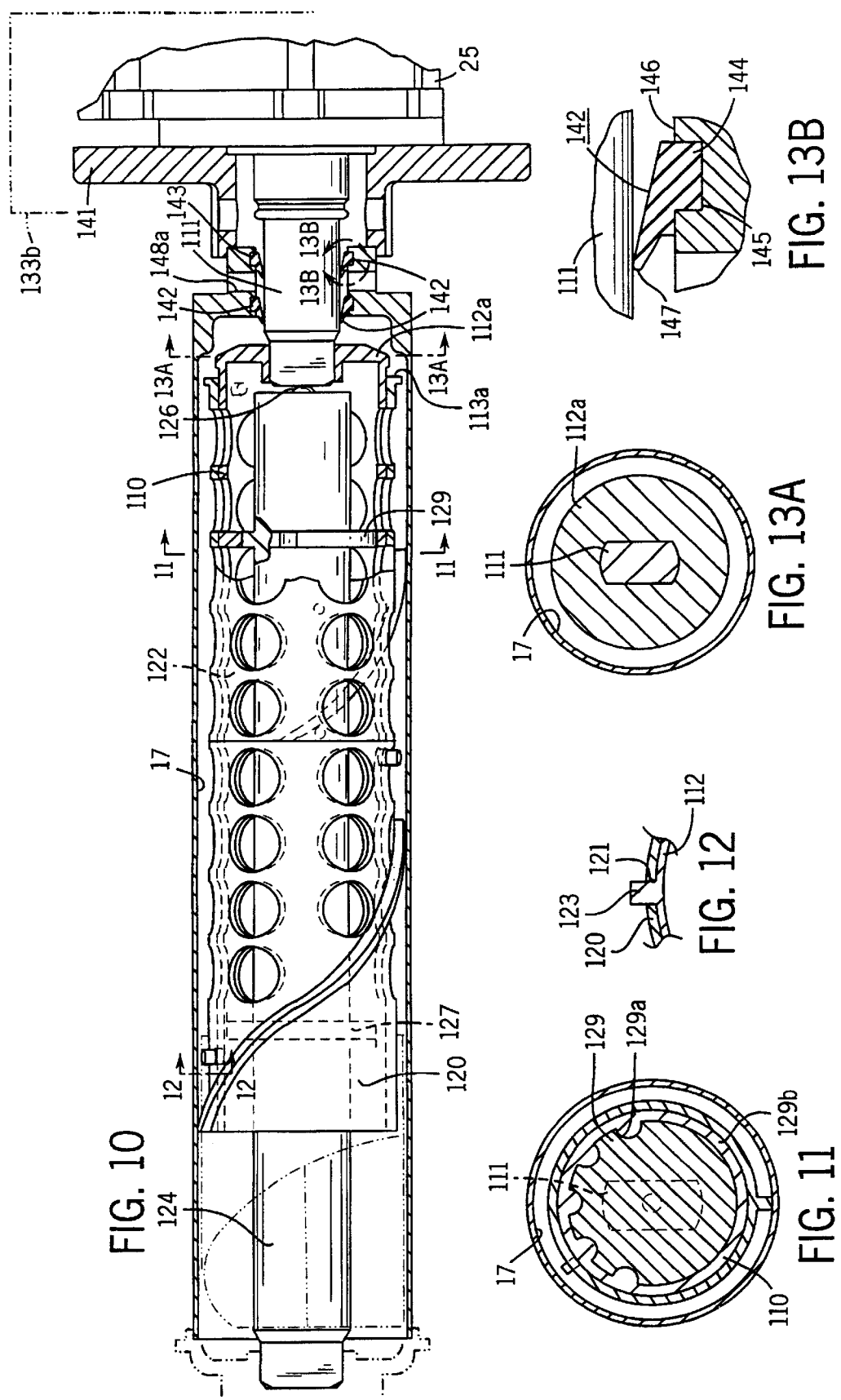

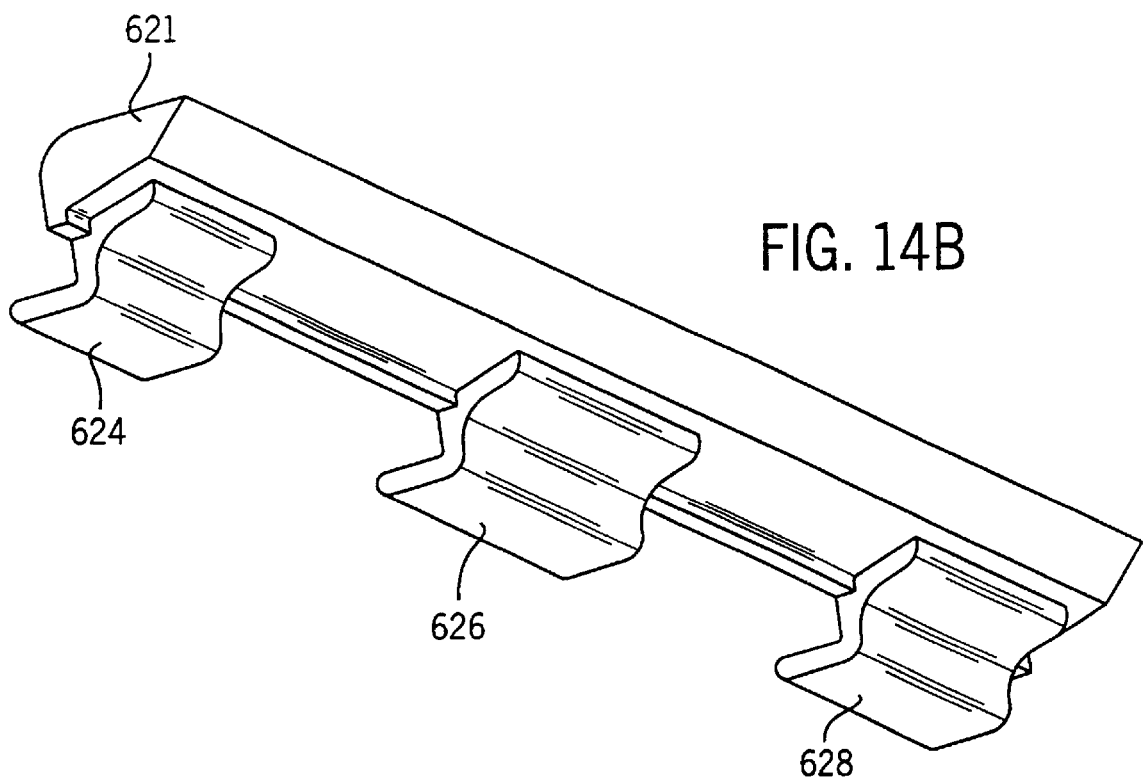
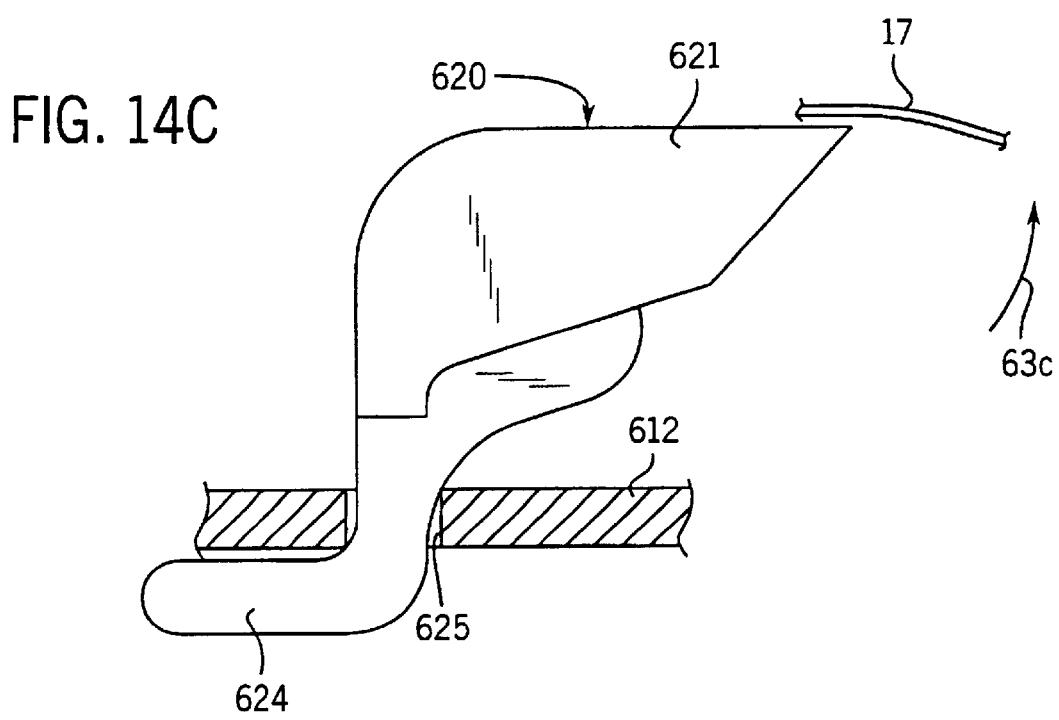

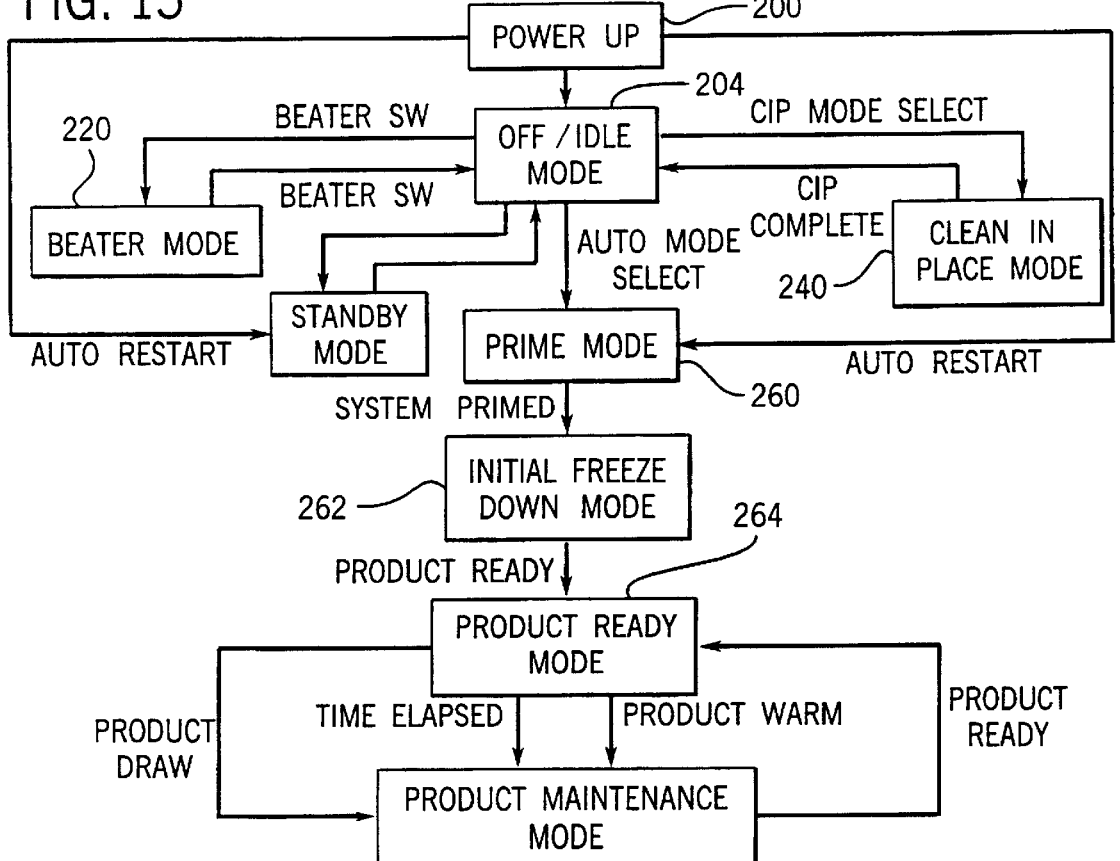
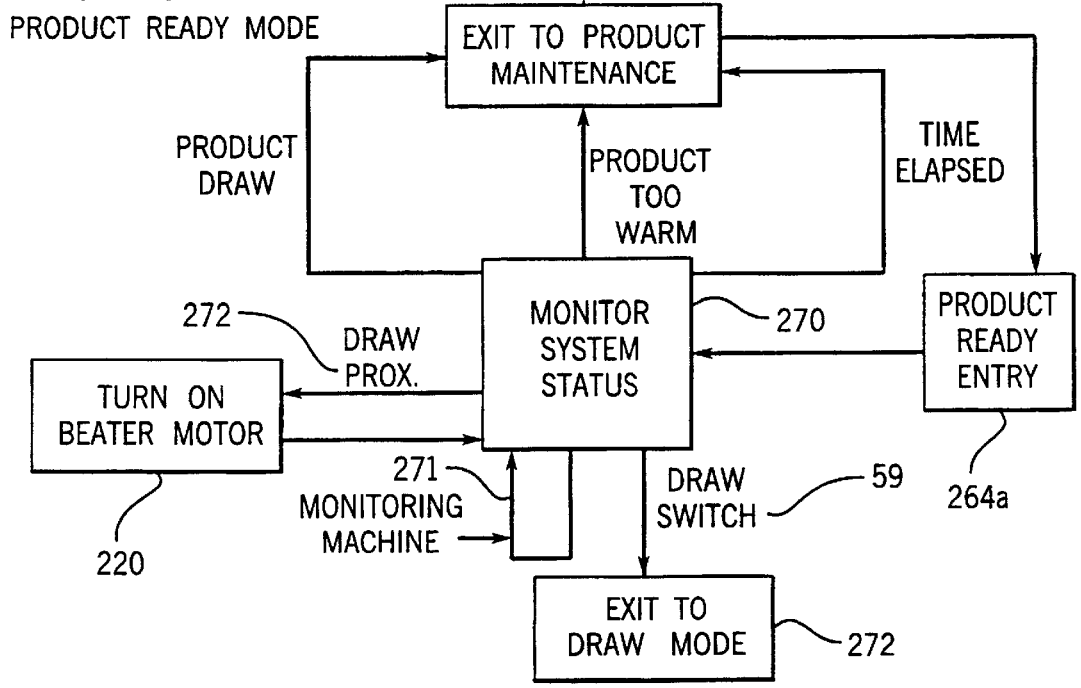

POWER UP MODE

PRIME MODE

FREEZE DOWN MODE

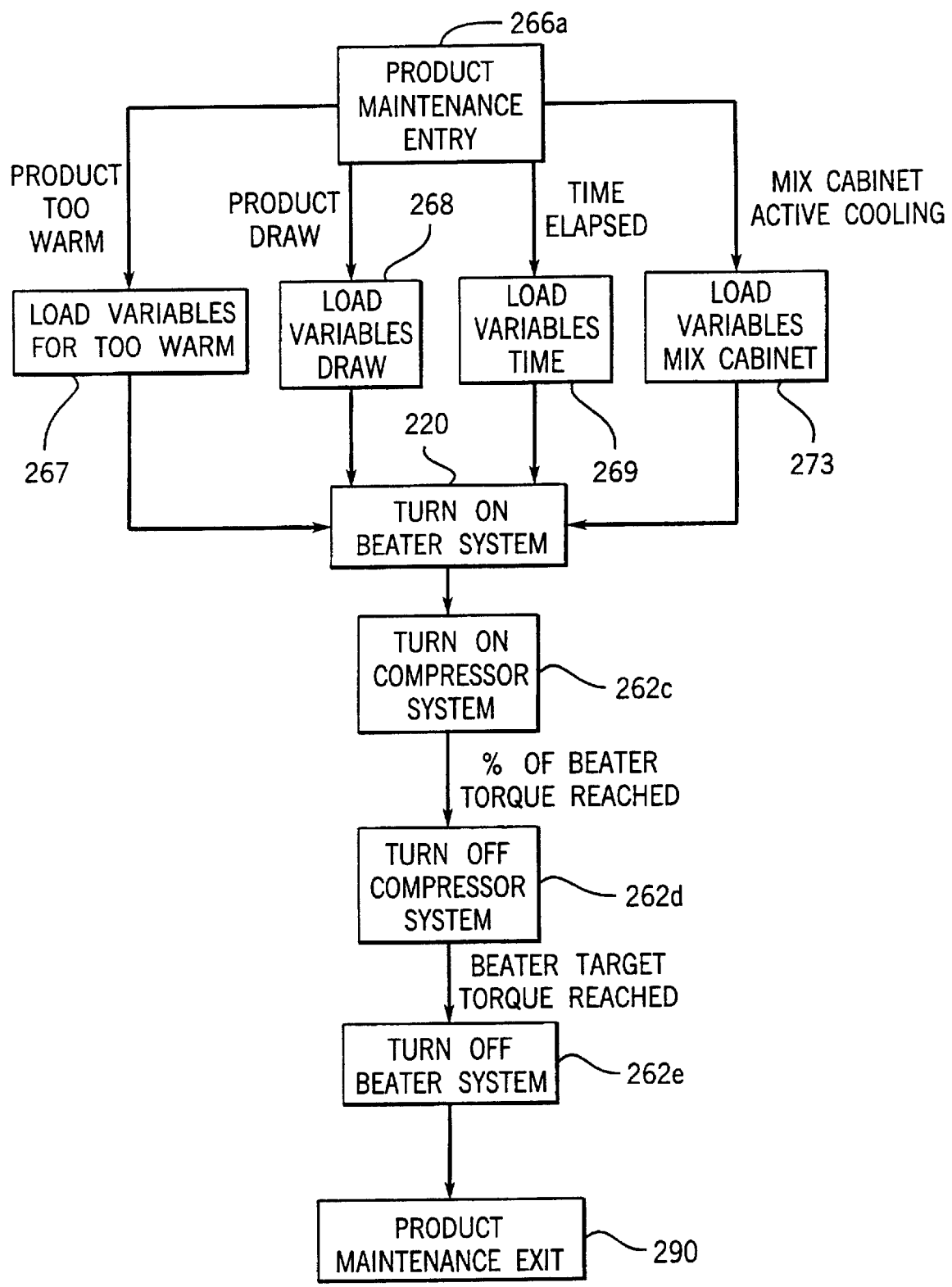

CLEAN IN PLACE MODE

VALVE AND DOOR ASSEMBLY FOR SEMI-FROZEN FOOD DISPENSING MACHINE

This application is related to 1) application Serial No. 09/265,689, filed on Mar. 10, 1999 and entitled "High Efficiency Refrigeration System", and claims priority from 2) Provisional application Serial No. 60/135,063, filed on May 20, 1999 and entitled "Semi-Frozen Food or Beverage Dispensing Machine", and is related to a) copending application Ser. No. PCT/US00/14005, filed on even date herewith and entitled "Improved Pre-Product Mix Cooling For A Semi-Frozen Food Dispensing Machine"; b) copending application Ser. No. PCT/US00/13825, filed on even date herewith and entitled "Improvements In Feeding And Controlling Product Pre-Mix In Semi-Frozen Food Dispensing Machines"; c) copending application Ser. No. PCT/US00/13781, filed on even date herewith and entitled "Apparatus And A Method For Clean-In-Place For A Semi-Frozen Food Dispensing Machine"; d) copending application Ser. No. PCT/US00/14029, filed on even date herewith and entitled "Improved Beater/Dasher For Semi-Frozen, Frozen Food Dispensing Machines".

BACKGROUND OF THE INVENTION

The present invention relates to improvements in semi-frozen, frozen food product or beverage refrigeration machines, and more specifically, relates to improved structures for improving the quality, consistency, and efficiency of operation while improving product yields and ease in cleaning of machinery utilized in the manufacture and dispensing of semi-frozen, frozen food products or beverages.

Dispensing Door Construction

An important structure in a softserve product refrigeration machine is the dispensing door construction, which usually also carries with it the product dispensing valve mechanism utilized for removing product from the freezing cylinder (evaporator). An ideal door would be one which minimizes condensation so that it does not have to be continuously attended to by an attendant; one that provides an excellent seal for the freezing cylinder when the door is closed; is designed so that the seal between the door and the freezing cylinder does not create an obstruction which catches the softserve product, or inhibits proper drainage of product/cleaning and/or sanitizing fluids therefrom when the freezing cylinder is being cleaned. Many designs have utilized a flat gasket between the door and freezer, such as the Clifford patent (U.S. Pat. No. 3,050,960, issued on Aug. 28, 1962), which construction requires a high pressure being exerted to effect a proper seal. Other designs have utilized an O-ring captured inside the freezing cylinder and projecting or protruding from the interior surface of the freezing cylinder. While an O-ring eliminates the need for high forces, it obstructs the proper drainage of product from the freezing cylinder. In essence, the O-ring design requires that the product exit port be raised above the bottom edge of the freezing cylinder by an amount equal to the width of the O-ring seal. In this manner, it is difficult to provide proper drainage of product or cleaning and/or sanitizing fluids when cleaning both the door and the freezing cylinder. It should be mentioned that U.S. Pat. No. 2,916,044, issued on Dec. 8, 1959, does illustrate a cover and serving valve for freezers utilizing an insulation which is primarily for inhibiting condensation due to the capturing of the retard (or baffle) in the cover.

Dispensing Valve Mechanism

Another important aspect of a properly designed softserve product refrigeration machine is the dispensing valve mechanism. While valve mechanisms have varied, it is absolutely essential that the mechanism be easy to clean. That is, the valve mechanism must have no physical internals which allow for food product retention such that it can be easily cleaned by flushing with sanitizers. Valve designs which use a plunger with O-rings have small crevices between the moving parts where food product becomes lodged and is difficult to remove in the cleaning process. These designs, moreover, allow leakage of food product past the O-ring and this leakage of food product makes it incapable of effective cleaning in a clean-in-place process. Moreover, this kind of design must be lubricated, which usually requires disassembly. Another desirable feature of an ideal dispensing valve is that all product in the dispensing spout should be forced from the valve leaving no residual product to later melt and dip.

In order that the reader may better understand the nuances of the softserve refrigeration and freezing process, the following material is tendered, and directed towards various ones of the copending applications set forth above.

Increasing Refrigeration Cycle Efficiency

Normally, semi-frozen, frozen confection food product or beverage (hereinafter "softserve product") is drawn from a freezing cylinder or chamber (evaporator) at intermittent times. However, the product must be in a proper state for serving when it is needed. Conventionally, to maintain product temperature and/or viscosity at an ideal state, the main refrigeration system is required to run quite frequently. Moreover, dependent upon the draw of the softserve product, additional quantities of product mix, usually kept at a refrigeration temperature below 41 degrees Fahrenheit to prevent spoilage, requires an increase draw of such mix, proper aeration or "overrun", which of course, creates further cycling of the main refrigeration system.

Numerous attempts have been made to reduce this refrigeration system recycling so as to increase the efficiency of the system. For example, in U.S. Pat. No. 5,386,709 (issued on Feb. 7, 1995), methods and apparatus are disclosed for incorporating thermal storage and other low temperature reservoirs with a secondary or retrofitable refrigerant circuit to increase the thermal operating capacity and efficiency by subcooling refrigerant condensate with subcoolers. However, auxiliary power equipment is required, once again lowering the overall system efficiency making it undesirable for softserve product dispensing refrigeration machines. In other systems, such as in U.S. Pat. No. 4,643,583 (issued on Feb. 17, 1987), a eutectic liquid is introduced into a space intermediate an inner metal vessel and an outer case. The purpose of the provision of a eutectic liquid is purportedly to maintain the vessel at a nearly constant temperature so as to ensure whisking (or commonly referred to as scraping) of the ice cream mixture within the cold storage container. But this system also requires a second refrigeration system in order to maintain the container at the whisking temperature.

During the transition from active freezing of the product to the idle state of the refrigeration system, the temperature of the evaporator must be raised to prevent "sticking" of the scraping or beater blades upon subsequent restarts. To accomplish this, the evaporation temperature should be preferably raised to within a few degrees of the product temperature. In this manner, "sticking" of the scrapers on the next restart does not occur. This is accomplished in the novel softserve apparatus by a novel method and means without necessitating a second refrigeration system.

Overrun

It is well-known that it is essential for consistency of softserve product that an amount of gaseous matter such as air should be incorporated into the liquid ice cream mix at the time of freezing. "Overrun", which is defined as a percentage, may be determined in a number of ways, one such way is:

$$\left(\frac{W_L}{W_P} - 1\right) \times 100$$

$W_L$=Weight of volume (test) of raw liquid mix
$W_P$=Weight of an equal volume of product (including air)

Overrun is accomplished either with a feed tube and air orifice in a gravity style freezer, such as illustrated in U.S. Pat. No. 5,706,720 (issued on Jan. 13, 1998) or a pump in a pressurized freezer. The feed tube method does not provide accurate control of overrun because the liquid fill rate is dependent upon the mix level in the hopper and the air flow rate is affected by "barrel" pressure. Thus, when product is being dispensed from the freezer, a pressure drop is sensed in the barrel (the feed tube or conduit which supplies applying mix and air to the freezer unit) changing the overrun percentage. Thus, with this type of apparatus, at best, a limited overrun range is provided and it is difficult to control the percentage (%) of overrun.

In a pressurized freezer, a pump is employed which provides somewhat improved accuracy allowing for a greater range of overrun but requires physical component change to vary the overrun settings. Moreover, the pump also adds a degree of complexity to the freezer operation because of the number of components that must be cleaned, lubricated and reassembled. Once more, the control of overrun by the pump is effected by the draw rate of the softserve product. Since the pump is a positive displacement device for the liquid portion and a pressure sensitive device for the air portion, while the liquid mix flow rate is not affected by changes in barrel pressure, which can vary with the draw rate, the air flow rate, being pressure sensitive, will vary as the barrel pressure changes. Such a system is shown in U.S. Pat. No. 4,457,876 (issued on Jul. 3, 1984). Once again, it would be desirable to provide a system which would allow control of overrun by an accurate setting of the overrun. Moreover, the system provided should be easily cleaned, preferably without removing or disassembling the system such as necessary with a pump system.

Beater or Scraping Blades

Once the mix and proper air mixture has been fed into the freezer, it is vital that the mix be moved or beaten so that a continuous folding or blending of the nearly frozen mixture occurs in the freezing cylinder, and that the material as it freezes in the freezing cylinder is whisked or scraped off and dropped back into the mix for further blending and movement within the cylinder. Most beater designs have involved a framework of stainless steel bars and castings. In fabrication, these designs required a large amount of welding or brazing to complete the manufacture. Moreover, welding oftentimes proves to be less sanitary than desired and the brazing operation also lacked compatibility with highly acidic mixes. While there have been many designs recommended for beater construction (see Re. 32,159 of May 27, 1986, which utilizes insertable blades), and the design illustrated in U.S. Pat. No. 512,002 (issued on Jan. 2, 1894), all of these designs require massive constructions and are difficult to fabricate in order to arrive at a strength sufficient to be able to properly fold or beat the softserve product. What is required in a properly constructed beater assembly is not only great strength (because the softserve product, such as a frozen confection e.g., softserve ice cream, is very stiff and offers high resistance to the rotation of the beater assembly or dasher) but also something that is easy to construct, will give better blending of the mix within the freezing chamber, and therefore give a consistently higher quality product at a higher throughput.

Mix Level Sensing

In an ideal softserve product refrigeration machine, it is desirable to provide a simple method for sensing the level of mix so that the equipment operator may be forewarned when the mix is almost depleted, as well as to inform him periodically as to how much mix is left in the product feed conduit to the freezing cylinder. Numerous prior art systems have been employed for level and/or amount sensing. For example, in U.S. Pat. No. 4,386,503 (issued on Jun. 7, 1983), pressure differences are used to regulate the supply of liquid $P_2S_5$ which allows for measurement of the liquid level in the device with respective pressure differences being utilized for regulating the supply of the liquid $P_2S_5$ to the cooling device. In this manner, a predetermined liquid level may be maintained. Moreover, patents such as U.S. Pat. No. 3,646,774 (issued on Mar. 7, 1972) utilize pressure sensitive switches for measuring material levels, while patents such as U.S. Pat. No. 4,417,610 (issued on Nov. 29, 1983) utilize some kind of pressure sensor located up stream of an outlet valve for effectively adjusting a length of the opening time interval as a function of a variation of an average medium pressure between consecutive operations of operating cycles of the outlet valve arrangement.

Clean-in-place (Cleaning of the Machine)

Conventionally, softserve machines require daily cleaning and/or sanitizing to insure that undesired bacteria and the like are eliminated. Because of the intricate parts of such machines, traditionally the machines must be disassembled and each part that contacts food thoroughly decontaminated and cleaned. The machine is then reassembled. This process can require trained personnel and personal attention several hours a day. Moreover, this procedure usually occurs after normal operation hours requiring overtime or additional personnel. What has long been desired, is a machine design which allows for "clean-in-place" and employs a method of cleaning that is reliable and safe, is quick and which does not require disassembly and reassembly of the machine while insuring cleanliness of the machine. That is accomplished by a softserve product refrigeration machine disclosed herein. As will be seen, special machine construction allows for complete "clean-in-place" operation without disassembly of the machine for cleaning.

Softserve Product Refrigeration Machine Operation & Control

A principal limitation of existing softserve product refrigeration machines is that they are setup "tuned" to run well under a typical set of environmental variables. Examples of these variables would be temperature, humidity, mix composition, power (electrical) quality, and the manner that the operator uses the machine. Whenever the machine is operated outside of the median point of these parameters (and others) the product quality suffers, in most cases not to a large degree but suffers nonetheless. In general the systems in use today must live with this loss. What is preferable, and what is accomplished advantageously with the softserve machine described herein, is a fully integrated system of mechanical and refrigeration hardware, electronic hardware, and software. This full integration allows each portion of the machine to perform functions that are best suited to that particular technique.

SUMMARY OF THE INVENTION

In view of the above, a principal advantage of the present invention is the novel dispensing door assembly for the freezing chamber or cylinder. To this end the assembly ensures tight closing of the freezing cylinder at the end thereof from which product egresses the freezing cylinder, and which, in conjunction with the novel cover design and interlocking dispensing valve design, ensures good locking action of and closing off of the freezing cylinder. Moreover, the advantage of the special cover design for the door not only ensures interlocking with the product dispenser to prevent inadvertent displacement of the door, but also inhibits condensation, which normally would occur because of the high temperature difference between the freezing cylinder and the atmosphere outside of the dispensing valve and door. To achieve these advantages, the freezing chamber includes a tube having a rim at one end thereof, the door assembly including a door, including alignment lugs on one of the door and the rim, and apertures, intended for reception of the lugs on the other of said door and rim, to ensure proper alignment of the door with the rim. An annular projection on one of the door and rim and an annular receptacle on the other of the door and rim, align when the door is in position in mating engagement with the rim. The inclusion of a Z-shaped (in cross section) seal fittable in the receptacle (with a depending radial extending lip) serves to receive the annular projection, the cup providing a radial seal and the lip providing an axial seal therewith. The cover member has an exterior and interior portion, the interior portion having a door engagement portion to cause pressing engagement between the door and the rim. A locking collar on the exterior portion of the cover provides locking engagement with the rim of the freezing cylinder, the major portion of the interior portion of the cover being spaced from the door to form an insulating air space to inhibit condensation.

Yet another advantage of the present machine structure is the ability to maintain the cleanliness of both the freezing cylinder and the associated door, cover and dispensing valve. To this end, a passageway in the door receives product from the freezing cylinder for communication with a product outlet from the door. A receptacle for insertion into the door is in a path aligned with the product outlet and a product dispensing valve is disposed in the receptacle. An aperture in the cover is aligned with the receptacle and engageable thereby, in conjunction with the valve, to retain and lock the cover to the door. The structure of the dispensing valve facilitates cleaning in situ. To this end, the dispensing valve includes a piston and a seat for the piston in the door in the product outlet, and a rolling diaphragm carried by the piston seals the receptacle from product whether the piston is either in a position to dispense product or is sealing the product outlet. In this manner, as the dispensing valve is open for dispensing the softserve product from the refrigeration machine, the diaphragm connected to the head end rolls with the upward movement of the piston leaving no cracks or crevices for the retention of unwanted products. Additionally, the openings allow for cleaning in situ of both the passageway and the dispensing outlet from the door, facilitating the maintenance of cleanliness of the machine.

Another advantage of this kind of dispensing valve for the softserve product is that a rolling diaphragm valve neither requires lubrication to keep it active nor periodic disassembly to lubricate. Moreover, by providing a novel flush system, such hard to get parts and places, such as the drive attachment to the beater, may be cleaned in situ.

The overall machine structure also provides numerous advantages. For example, the present softserve machine provides the advantages of a closed refrigeration system having a recirculating refrigerant path, the system including the conventional condenser having a liquid refrigerant output, a throttling expansion valve for changing the state of the refrigerant to a gas, and an evaporator serially connected in the refrigerant path. A subcooler is placed intermediate the condenser and the throttling expansion valve, the subcooler having a primary and secondary side. The primary side of the subcooler is in the path of the high-pressure liquid refrigerant from the condenser, and a path of gaseous refrigerant is supplied from the outlet of the evaporator to the secondary side of the subcooler, in heat exchange relation with the primary side. A heat sink in the subcooler is placed in heat exchange relation with both the primary and secondary sides of the subcooler. A tap on the liquid side of the refrigeration path, from the subcooler, forms a secondary refrigeration path for cooling a product mix container with a refrigeration coil therein so as to maintain the product mix at a predetermined temperature. The heat sink in the subcooler increases the efficiency of the system, reducing cycling of the refrigeration system, while having the ability to transfer heat out of the subcooler when the system is running and absorb heat so as to reduce the running cycle of the refrigeration system when the system is idle. This permits lengthening times or periods of passive cooling and advantageously eliminates the requirement of a separate active refrigeration system for the product mix cabinet.

Another advantage of the present softserve machine is the ability to consistently provide a predetermined mixture of product mix and a gaseous medium (e.g., air) to a freezing chamber of a softserve product refrigeration machine. This is accomplished by providing a pressurized mix container that is connected to a source of pressurized gas (e.g. air) connected to the gas or air supply inlet of the pressurized mix container. A product mix outlet from the pressurized container, in the form of a conduit, connects the pressurized mix container to the freezing cylinder of the softserve product refrigeration machine. The pressurized gaseous matter, at the same pressure as applied to the mix container, is also applied to a gaseous matter (air) injection point in the conduit to affect mixing of gas (air) and product mix before entry of the mix into the freezing chamber. By introducing a pressure adjuster (e.g., a needle valve) in the line, the ratio of gas (air) to mix may be closely regulated so as to control "overrun."

Still another advantage of the present apparatus in a softserve machine is the ability to determine the amount of mix left in the pressurized mix container. This is accomplished by including a gas/air pressure dump valve intermediate the source of pressurized gas/air and the gas/air supply inlet of the mix container. The dump valve is controlled to isolate the source of pressurized gas/air from the mix container and allows the dumping of gas/air from the mix container for predetermined periods of time. The change of pressure per predetermined time of the gas/air dump indicates the quantity of mix left in the mix cabinet.

Another advantage of the apparatus of the present structure is that a simple instrument may be provided to determine when the mix is entirely gone from the pressurized mix container. To this end, an instrument, such as a thermal probe having a thermister or the like therein, may be placed at the injection point at the conduit. This means the probe is preferably placed in the mix line feeding the air/mix chamber or barrel. By forcing a small electric current through the thermister probe, as the thermister has an impedance, the current creates heating of the thermister. When mix is present, the liquid mix rapidly dissipates the heat of the thermister. But when all the mix is depleted, the thermal conductivity surrounding the probe is reduced and the thermister becomes warmer. This rise in temperature can be electrically sensed by the controls as the resistance of the thermister diminishes with rising temperature. In this manner, the control detects the presence or absence of a liquid mix.

Another distinct advantage of the apparatus of the softserve machine is a new beater assembly design (commonly called a dasher in the softserve product refrigeration machine art). The advantages of high-strength and ease of construction while maintaining better blending and consistency of product as well as increased throughput all lend themselves to a more efficient machine for dispensing softserve product. To this end, the beater assembly comprises a foraminous tube without any welded parts. The front helical portion of the beater, which forces product out of the freezer through the dispensing valve (product pushing helical member), is preferably made of an easily cleaned plastic which is readily molded and inserted, as by key ways, into one end of the foraminous cylinder. The scraping elements of the dasher or beater are also preferably composed of a material, such as a plastic, for whisking or scraping the interior surface of the freezing cylinder. These scraping elements may be provided with a snap type fitting which allows them to be snapped into place in appropriate places on the cylinder. Preferably, the scraping elements should be biased toward the interior of the freezing cylinder to compensate for wear of the scraping elements due to rotation within the freezing cylinder. The driving portion of the foraminous cylinder includes a baffle rod for non-driving engagement at one end with a rotatable drive shaft (for effecting rotation of the foraminous cylinder) and at the forward end with the door assembly or other means to inhibit rotation of the baffle rod. The baffle rod is positioned within the cylindrical beater (foraminous cylinder), and is eccentric to the centerline of the beater, and mounted so as to be stationary with respect to beater rotation. The baffle rod may include foraminous hubs or elements through which mix is forced, helping to insure a good blending of the mix in the freezing cylinder.

Still another feature of the present machine is the provision of a control for the machine which facilitates hands-off operation and adjusts the machine, regardless of the drawdown of the product, to insure the quality of the product.

Other advantages and features and a more complete understanding of the invention may be had by reference to the following specification and claims taken in conjunction with the accompanying drawings in which:

BRIEF DESCRIPTION OF THE DRAWINGS

FIG. 8 is an enlarged end elevation view of the door assembly illustrated in exploded fashion in FIGS. 6A–7;

FIG. 9 is an enlarged fragmentary sectional view taken along lines 9—9 of FIG. 8;

FIG. 10 is a fragmentary, side elevational view of a novel beater or dasher assembly constructed advantageously for the softserver machine, and in position in the freezing cylinder for being rotatably driven by a motor including novel shaft sealing for facilitating sanitary flushing of the apparatus;

FIG. 11 is a fragmentary sectional view taken along line 11—11 of FIG. 10;

FIG. 12 is a fragmentary sectional view taken along line 12—12 of FIG. 10;

FIG. 13A is a fragmentary sectional view taken along line 13—13 of FIG. 10;

FIG. 13B is an enlarged fragmentary sectional view of a portion of a seal and shaft illustrated in FIG. 10;

FIG. 14B is an enlarged perspective view of a scraper blade used in the beater/dasher of FIG. 14;

FIG. 14C is a fragmentary sectional view taken along line 14C—14C of FIG. 14A;

FIG. 15 is a state diagram illustrating the general software structure and requirements for the basic mode of operation of the softserve machine;

FIG. 19 is a state diagram illustrating the state of the softserve machine when the product is in a product ready mode and being maintained in that state by utilizing passive cooling in order to keep the product near a predetermined quality for as long as possible;

FIG. 20 is a state diagram illustrating the softserve machine in an active product maintenance mode, when the product has become too warm and/or has been allowed to sit in the barrel of the softserve machine and requires re-freezing and more gas (air) to be incorporated into the product mix;

DETAILED DESCRIPTION OF THE PREFERRED EMBODIMENTS

Overall Description of the Machine

Figure 1:
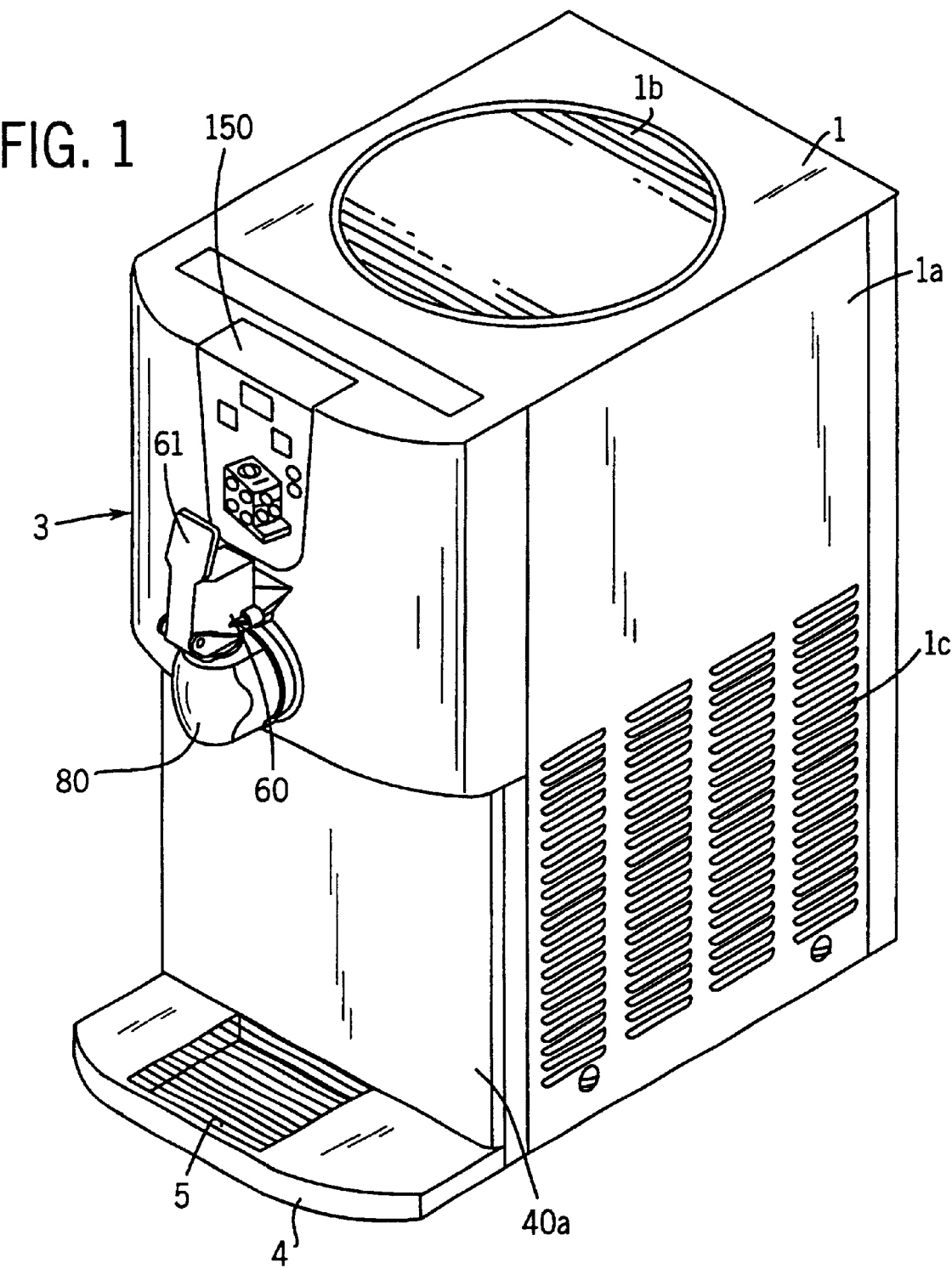
FIG. 1 is a perspective view of a semi-frozen, frozen food or beverage dispensing ("softserve") machine constructed in accordance with various advantageous features including those of the present invention.

Turning now to FIG. 1, a semi-frozen, frozen food or beverage dispensing ("softserve") machine 1, constructed in accordance with various features of the present invention, is illustrated therein. As shown, the softserve machine 1 includes a cabinet 1a including top and side panels 2a and 2b including respectively an air deflector 1b and side vents 1c. The front 3 of the machine 1 comprises a softserve product dispenser or product dispensing valve assembly 60, and manually operable handle 61 thereon to permit the operator to draw softserve product through the valve assembly 60, in a manner to be described more completely hereinafter. As is typical in this kind of machine, a drip tray 4, including a product splash shield 5 is positioned below the product dispenser or valve assembly 60.

Figure 2:
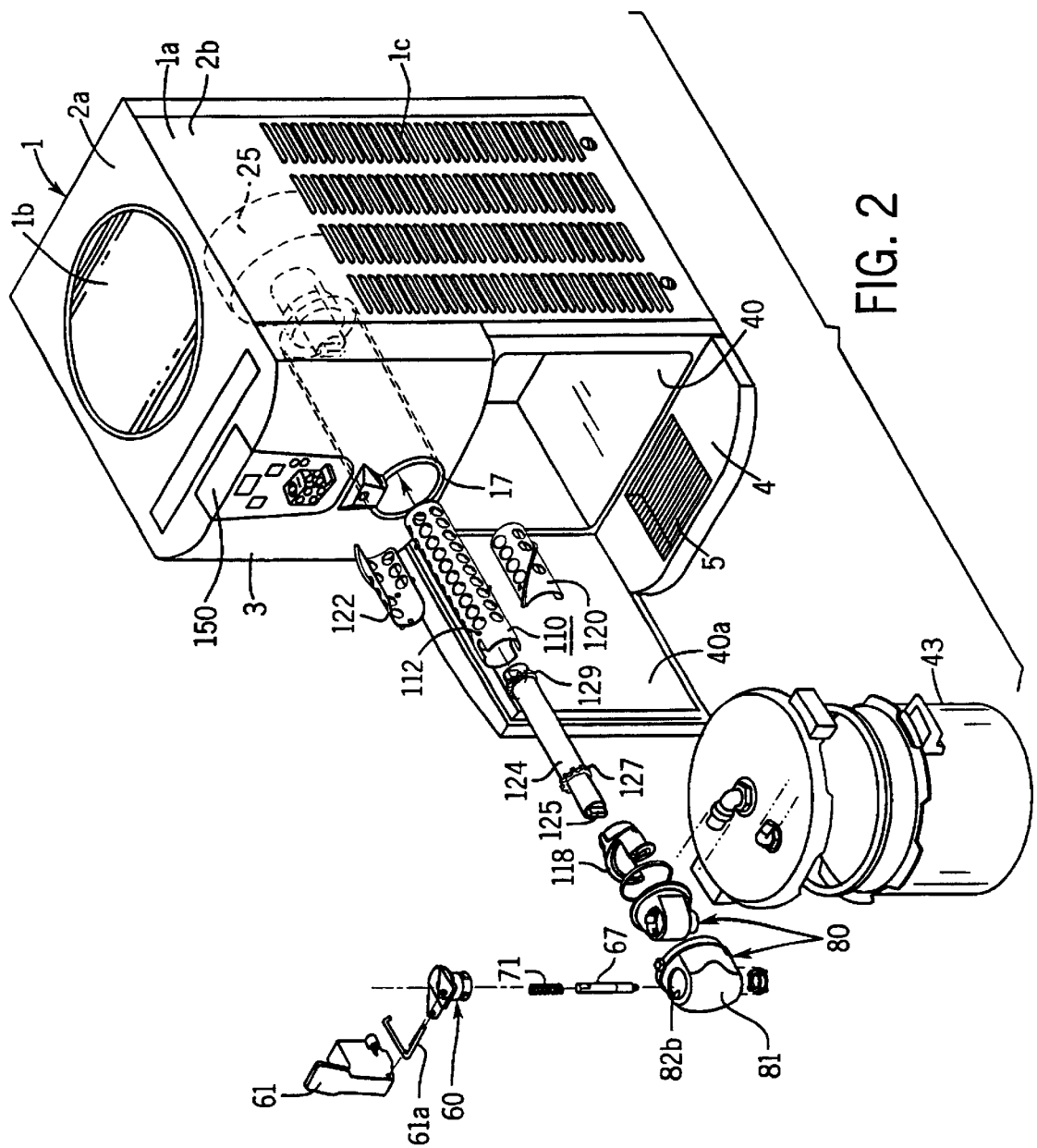
FIG. 2 is an exploded perspective view of the machine illustrated in FIG. 1 and showing selected parts of the softserve machine displaced to illustrate generally their relative placement.

Just above the drip tray 4 is a door 40a which allows operator access into a refrigerated mix storage cabinet or compartment 40 (see FIG. 2). In use, the cabinet 40 houses a pressurized product mix container 43 which provides product mix, in a novel manner, which will be explained hereinafter, to the freezing cylinder 17 of an evaporator 16. A novel and efficient beater (or dasher) 110 including a foraminous sleeve or cylinder 112 serves to agitate and mix the product within the freezing cylinder 17 and allow for product mix uniformity and consistency. A control and display panel 150 displays system conditions and allows for operator control over at least selected ones of them.

THE REFRIGERATION AND SUBCOOLER ARRANGEMENT

Figure 3:
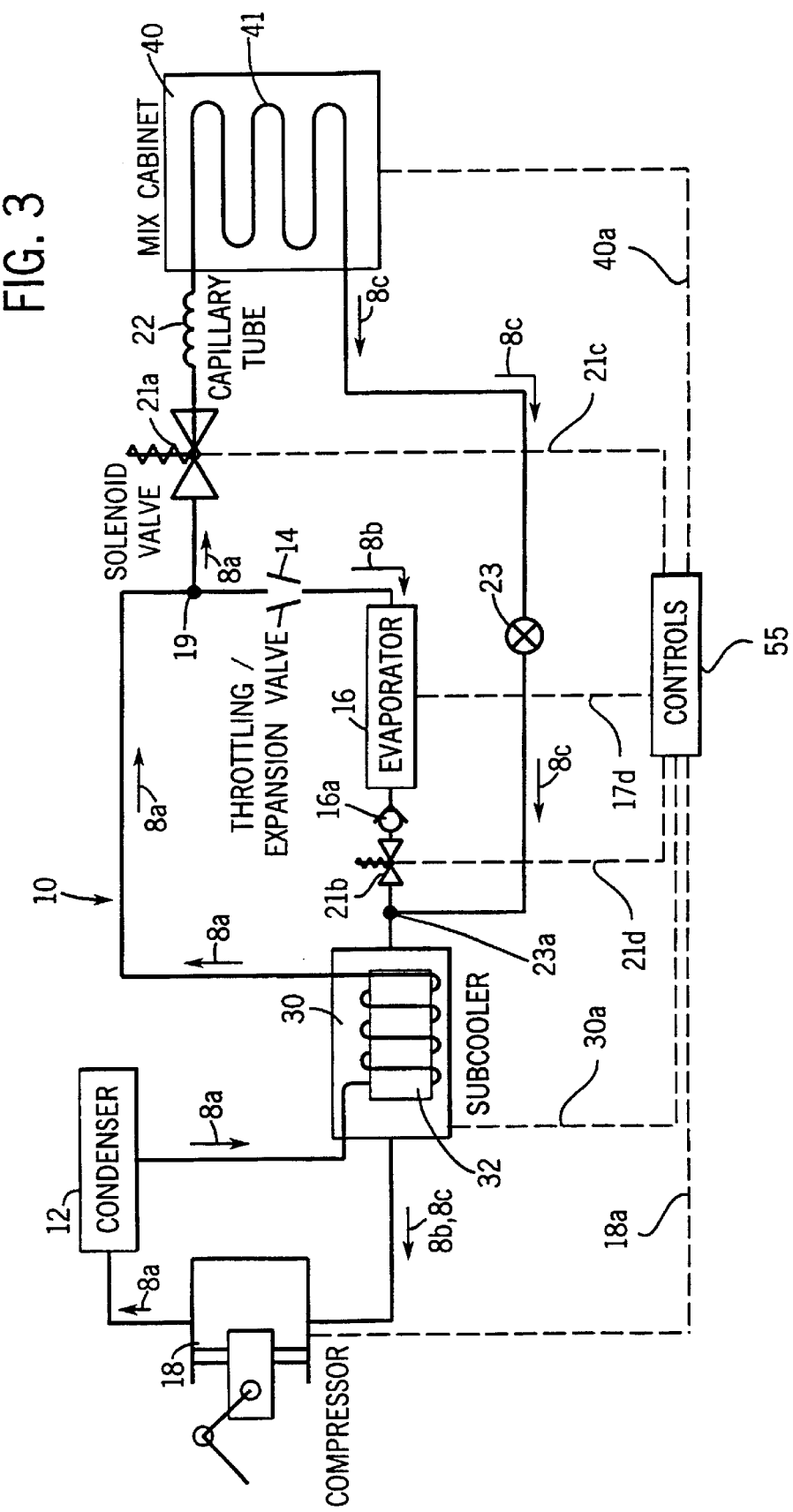
FIG. 3 is a schematic diagram of an improved refrigeration system utilized in the softserve machine illustrated in FIGS. 1 and 2, and employing a subcooler with contained heat sink, and auxiliary, tapped cooling system for product mix to achieve greater efficiencies in operation of softserve product refrigeration machines.

Turning now to FIG. 3, a main refrigeration system 10 includes a condenser 12, a throttling expansion valve 14, an evaporator 16 and a compressor 18. As shall be described more completely hereinafter, a subcooler 30 has a primary refrigerant flow circuit disposed in the primary side of the refrigerant path (high pressure side as indicated by the arrows 8a which show high pressure refrigerant flow), and having a secondary refrigerant flow circuit disposed in the low pressure side of the refrigerant flow circuit, as indicated by the direction of refrigerant flow arrows 8b.

As illustrated in FIG. 3, a tap 19 is formed in the high pressure side of the refrigeration system before the throttling and expansion valve 14, to provide a flow of refrigerant to the refrigerated mix cabinet 40 as through a first solenoid valve 21a and conventional capillary tube 22 (which acts as a throttling/expansion valve). As shown, the refrigerated mix cabinet 40 operates in parallel with the evaporator 16, and as shall become apparent, is aided in being maintained at its proper pre-mix temperature by operation of the subcooler 30. The refrigerant passes through refrigeration coil 41 and the gaseous mixture follows the path as given by the refrigerant path arrow 8c, past an evaporator pressure regulator or EPR valve 23. The EPR valve 23 controls back pressure in the mix cabinet 40. The output of the EPR valve 23 joins the evaporator 16 gas output at junction 23a. The gaseous refrigerant output from the evaporator 16 passes through a check valve 16a, a second solenoid valve 21b, to the junction 23a to the subcooler 30 and then through the subcooler 30 to the suction side of the refrigeration compressor 18. The second solenoid valve 21b controls refrigerant flow from the evaporator 16.

The subcooler 30 is provided with a heat sink comprising a canister 32 of an adjustable phase/state solution, such as a glycol/water mixture so that the canister 32 will dispel heat during the main cooling cycle of the soft serve freezer or evaporator 16, whereby a steady residual cooling may be effected thereby during periods of low or no product draw from the product dispensing valve 60. Normally, product is drawn intermittently from the soft serve freezing cylinder 17 but must be in a proper product serve state when the product is needed. To maintain the product in an optimal state for serving at all times, the main refrigeration system is normally run quite frequently. (Moreover, as more fully explained hereinafter, the temperature and internal pressure within the freezing cylinder 17 is monitored and controlled by a controls/control system 55, as through monitor and control lines 17d.) This frequency of runs or run cycles may be reduced by providing a reserve supply of partially frozen solution such as glycol solution in the container 32 during the run periods. The partially frozen glycol will then act as a heat sink during the off periods thus providing continued cooling to both the softserve product and the auxiliary mix storage cabinet 40. This is accomplished without the addition of any special components since the refrigerant in the system condenses at the coldest surface within the system and maintains a pressure equivalent to the vapor pressure at that point. Liquid refrigerant is supplied, as needed to the capillary tube 22, and then as gaseous refrigerant to the coil 41 of the mix cabinet 40 so that cooling will continue. As long as the frozen glycol (as monitored by control line 30a) remains colder than the product mix in the mix cabinet 40, (as monitored by the control line 40a) the glycol will continue to draw heat from the mix cabinet. (Moreover, dependent upon the control of the backpressure in the evaporator by the valve 21b, heat may also be drawn from the evaporator 16). The check valve 16a in the refrigerant outlet side of the evaporator 16 ensures that heat drawn from the mix cabinet 40 via the gaseous refrigerant is drawn to the glycol canister 32. The glycol canister 32 is preferably and conveniently enclosed within the subcooler to obtain maximum efficiency. In practice, the container may hold approximately two quarts of a glycol/water solution to achieve good results in a small system by reducing the cycling of the refrigerant through the refrigeration cycle.

It should be recognized that the utilization of a subcooler increases the refrigeration efficiency of the system and permits of greater utilization of a smaller evaporator or freezing cylinder 17. Moreover, by proper operation of the control/control system 55, and predetermined operation of the valves 21a and 21b through control line 21c and 21d respectively, while controlling active refrigeration, for example by control of the compressor 18 through control line 18a, passive cooling by the subcooler operates to increase the possible off time of the system. Additionally, as shall be seen in the portion of this specification describing the modes of operation of the control system 55, product draw down (removal of semi-frozen product from the evaporator or freezing cylinder) can be used to cause the refrigeration system to become active (e.g., cause the refrigeration compressor 18 to cycle on) and of course non-active (e.g., cause the refrigeration compressor 18 to cycle off) via control line 18a.

METERING ASSEMBLY

As noted heretofore, the interior of the evaporator 16 illustrated in FIGS. 2 and 10, is normally referred to as a freezing cylinder 17. Interiorly of the freezing cylinder 17 and mounted for rotation therein, is the dasher or beater assembly 110. (It is noted at this juncture in the description, that another embodiment of the beater or dasher assembly 610 is shown in FIG. 14, either assembly being acceptable and interchangeable, one with the other). However, referring first to FIG. 10, the beater 110 is connected to a shaft 111 which in turn is suitably connected to drive means, in the illustrated instance a motor 25 to effect rotation of the beater or dasher. At the opposite end of the freezing cylinder 17 is located a door assembly 80, which will be more fully described relative to FIGS. 8 and 9, and which includes a product dispensing valve 60, (see FIGS. 2 and 9), the dispensing actuator or handle 61 of which is illustrated as being mounted in the door assembly 80.

Figure 4:
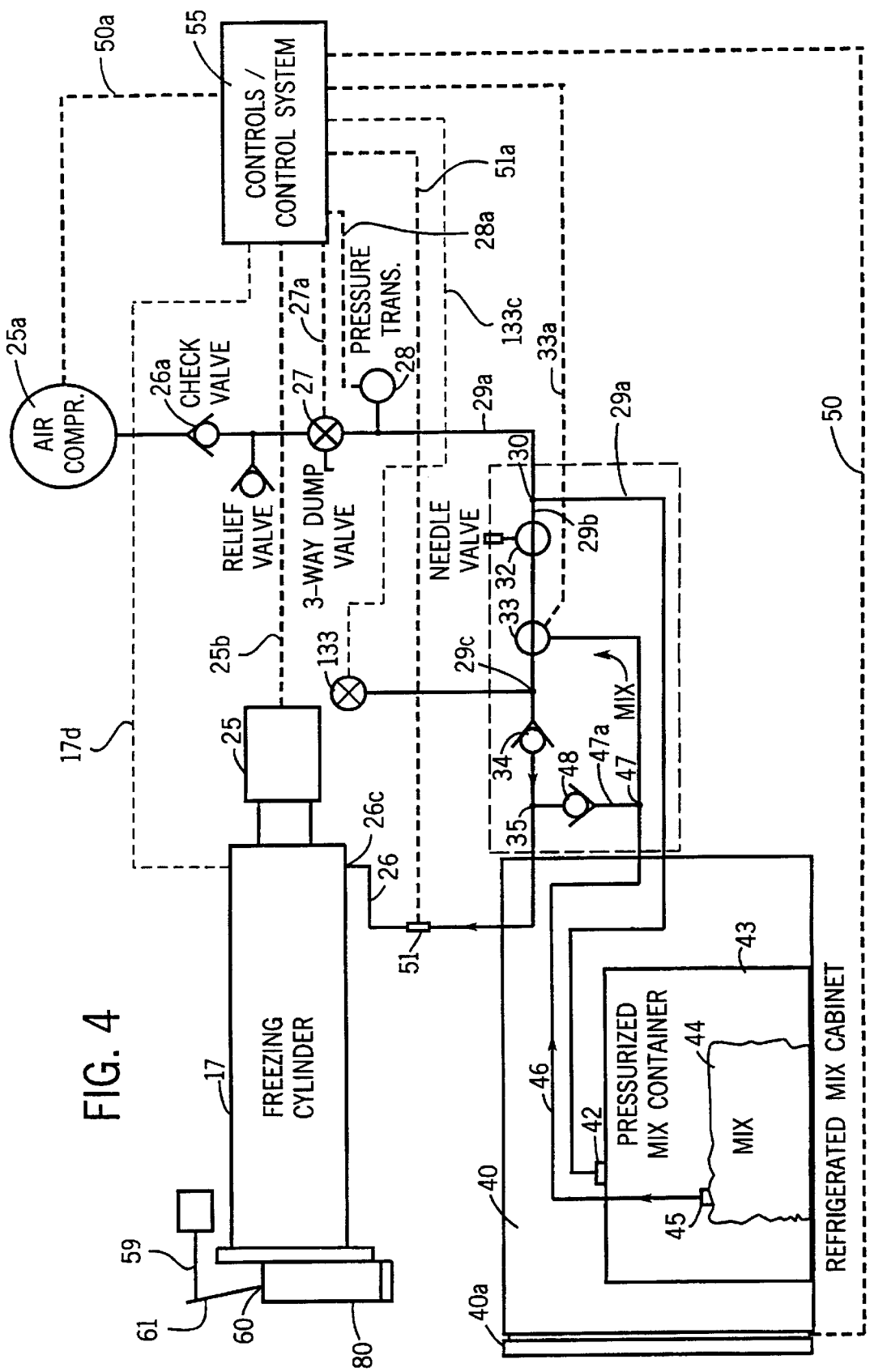
FIG. 4 is a schematic diagram illustrating a method and apparatus for applying product mix to the freezing cylinder with the proper amount of overrun, as well as illustrating how gas (e.g., air), from a common pressurized source, may be injected into the barrel of the product mix being provided to the freezing cylinder.

The product mix to charge the freezing cylinder is normally a liquid product mixture. However, it should be recognized that the charging mixture can be a pellet and liquid mix or any other pre-mix which permits feeding of the mix into the freezing cylinder and allows for proper air entry into and entrainment within the mix. Turning to FIG. 4, in order to provide the proper amount of gas (e.g., air, and hereinafter referred to as air) for incorporation into a product mix (e.g., liquid) softserve at the time of freezing within the freezing cylinder 17, apparatus is provided to properly meter the air into the mix in a manner which allows consistency of the mix to air ratio. (It should be recognized that in conventional mix preparation into the freezing cylinder 17, air is the gas mainly employed. However, it should also be recognized that other gas mixtures may be supplied in lieu of air, for example, to add flavoring, etc.). This mixture or ratio is referred to as "overrun" expressed as a percentage as to a predetermined volume of liquid product mix versus the weight of an equal volume of product. Since the equal volume of product will of necessity include air, its weight is going to be less than the weight of an equal volume of mix. As has been explained heretofore, the control of overrun may be accomplished with a gravity feed tube and air orifice with a gravity style freezer. Alternatively, a mix feed pump may be employed for a pressurized freezer. The feed tube method does not provide accurate control of the overrun due to the liquid fill rate being dependent upon mix level in the hopper, and the air flow rate being affected by the pressure in the "barrel" (which is the portion of conduit or piping 26 which feeds a mixture of air and liquid mix into the freezing cylinder 17). While the gravity or feed tube method provides a limited overrun range, the pump type system provides improved accuracy while allowing for a greater range of overrun but requires physical component changes to vary the overrun setting. Moreover, such structure adds a degree of complexity to the freezer operation because of the number of components the operator must clean, lubricate and reassemble. Additionally, because a positive displacement pump is utilized in pressurized systems, which is employed for the supply of the liquid portion of the mix, and a pressure sensitive device for the air portion, the control of overrun is difficult. That is, the only thing that will change in the barrel 26 will be the air flow rate because it is pressure sensitive. Thus, during product draw, down pressure variations can occur causing changes in the amount of air provided to the product mix creating inconsistent and unpredictable product mix overrun.

This problem has been resolved by providing a product mix (e.g., liquid) and air delivery system which provides a product mixture and entrained air mix at a rate which are both pressure sensitive, such that when the draw rate of the product varies, causing a variation in pressure within the barrel, both the liquid delivery rate and the air delivery rate will change proportionately maintaining a constant ratio of air to liquid.

To this end, a source of pressurized air, in the illustrated instance an air compressor 25a is connected through a check valve 26a to a three way, solenoid operated dump valve 27. A suitable relief valve 26b is provided intermediate the check valve 26a and the three way valve 27. The output of the three-way valve 27 is to a pressure transducer 28, and through a conduit line or pipe 29a, through the mix cabinet 40, into the air inlet 42 of a pressurized mix container 43. The air pressure is monitored and the pressure transducer set as by control line 28a connected to the controls/control system 55. Liquid product may be provided into the pressurized mix container 43 to provide a level of product mix in the container 43, or the mix may be provided in the form of a collapsible, flexible bag 44. As shall become clear in the portion of this specification discussing clean-in-place, the container 43 or the collapsible, flexible bag 44 may be filled with a cleaning and/or sanitizing liquid for cleaning the system, in lieu of product mix. The mix bag or mix container 43 contains a product outlet 45. To facilitate cleaning, it is preferable that the mix container 43 is removable from the mix cabinet 40. As pressure builds up in the pressurized mix container 43, product mix is displaced through the outlet 45, through piping 46 to a tee 47, one pipe 47a of which provides the product mix through a check valve 48 to the barrel 26, and ultimately the freezing cylinder 17.

As illustrated in the drawings, a tee 30 splits the air output line into conduits or piping 29a and 29b. Thus the same air pressure exists in lines 29a and 29b both being provided by the source of air or air compressor 25a. The air from the tee 30 passing through line 29b passes a pressure adjuster 32, in the illustrated instance a needle valve or the like which allows for adjusting the air pressure in the line extension 29c following the needle valve. Another solenoid operated three way valve 33 in the line 29c and a check valve 34 allows air to be injected into the barrel 26 at an air injection point 35. Thus the air source provides pressure for both the mix container and the air to be metered into the product. This ensures that both product supply and air feed are at an identical pressure level to inherently yield a consistent ratio of air-to-mix. The pressure adjuster 32 also acts to adjust the amount of air delivered. The check valves, both 34 and 48, serve their obvious purpose to prevent mix from traveling back up to the pressure adjuster or needle valve 32 while the check valve 48 prevents air from being injected backward through the air outlet 45 into the bag of mix or into the liquid in the pressurized mix container 43. It should be noted that the position of the three way valve 33, in FIG. 4, when it is in a first position, inhibits mix in line 46 from entering into the air supply line from pressure adjuster or needle valve 32 while permitting air flow to the barrel 26 in the path above identified.

A second solenoid operated two-way valve 133 is shown as tapped off between the three way dump valve 33 and check valve 34, and in the normal mix and air supply mode, such as illustrated in FIG. 4, has only the function of allowing a series connection of air from the pressure adjuster or needle valve 32, through the three way valve 33 to the check valve 34. However, the purpose and use of two way valve 133 shall become evident with respect to a discussion of the clean-in-place (CIP) description relative to FIG. 5. Suffice at this point, that the valve 133 is also under control of the controls/control system 55 as by way of control line 133c.

The refrigerated mix cabinet 40, in which the pressurized mix container 43 is housed, includes a conventional door 40a which includes a safety interlock to prevent opening the mix container 43 when under pressure. This is accomplished by feeding a signal along signal line 50 to a controls/control system 55, which in turn through signal line 27a changes the operation of the solenoid operated three way dump valve 27 and allows pressure inside the pressurized mix container to dump through line 29a and backwards through the dump valve 27 to the atmosphere. Dump valve 33, which has been set by controls/control system 55 by way of signal line 33a, is positioned into a second position to now prevent the air supply from progressing into the barrel 26, and inhibit further passage of mix from line 46 into the barrel 26 through check valve 48. At the same time that the three-way dump valve 27 is placed in the dump position the compressor air flow to the mix container 43 is stopped due to the dumping action of the valve 27. Alternatively, or in connection with the forgoing, the controls/control system 55, through signal line 50a may shut off the air compressor 25a. Moreover, since the three-way dump valve 27 dropped the pressurize in the mix container 43, the door 40a may be safely opened by the operator as signaled by the control line 50, disengaging the door interlock.

CLEAN-IN-PLACE (CIP)

Conventionally, softserve machines require daily cleaning and/or sanitizing to insure that undesired bacteria and the like are eliminated. Because of the intricate parts of such machines, traditionally the machines must be disassembled and each part that contacts food thoroughly decontaminated and cleaned. The machine is then reassembled. This process can require trained personnel and personal attention several hours a day. Moreover, this procedure usually occurs after normal operation hours requiring overtime or additional personnel. What has long been desired, is a machine design which allows for "clean-in-place" or clean-in-situ and employs a method of cleaning that is reliable and safe, is quick and which does not require disassembly and reassembly of the machine while insuring cleanliness of the machine.

Figure 5:
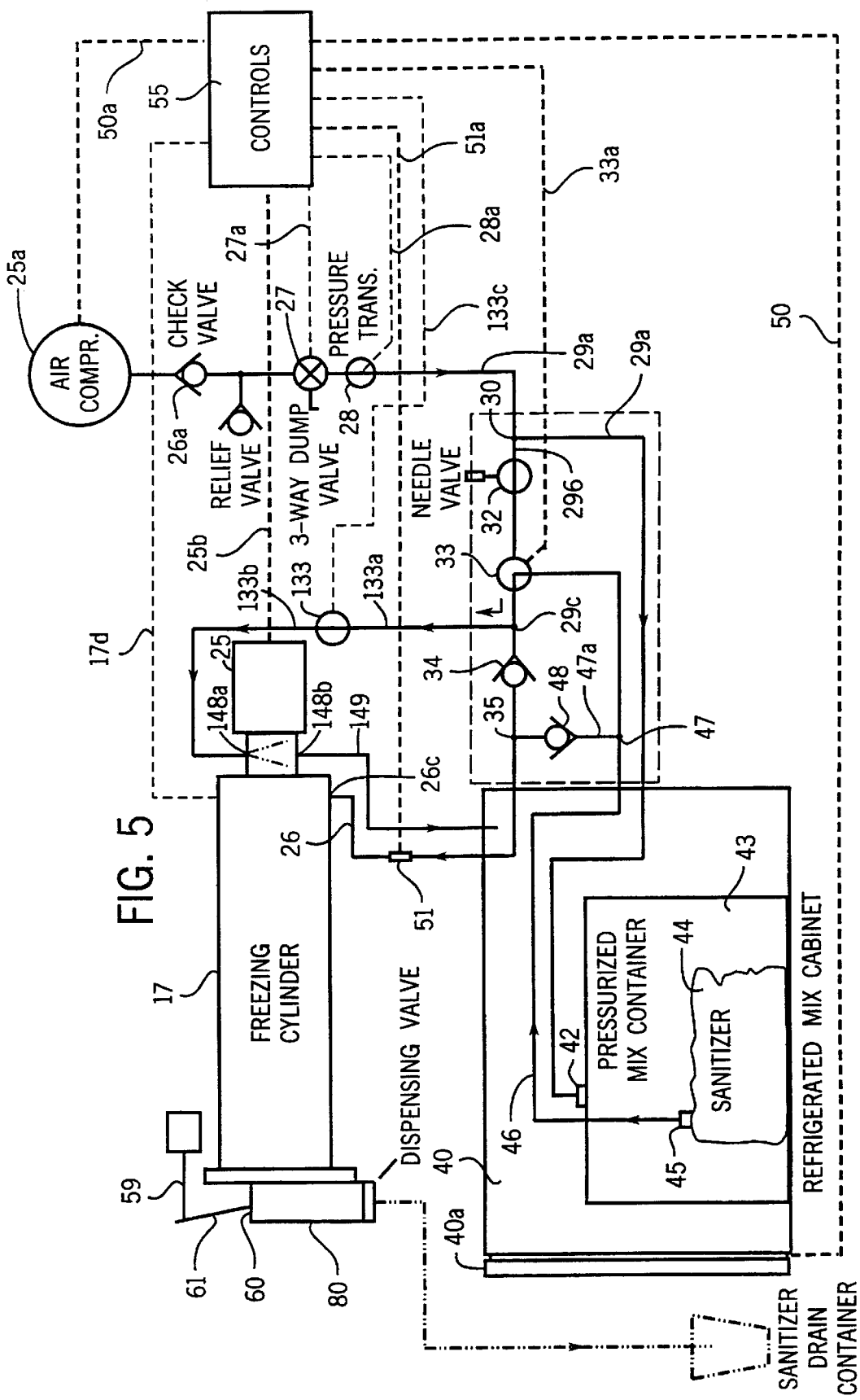
FIG. 5 is a fragmentary schematic view of the apparatus illustrated in FIG. 4 and in which the valves are positioned to permit cleaning of the apparatus.

To this end, and referring now to FIG. 5, in lieu of the bag 44 of mix contained in the pressurized mix container 43, the pressurized mix container may be provided with a quantity of cleaning and/or sanitizing liquid or the like for direct pressurization thereof and ejection through line 46. Alternatively, and as illustrated in FIG. 5, a bag 44 of liquid sanitizer may be placed in the mix container 43 so that when the container 43 is pressurized, cleaning and/or sanitizing liquid is forced out of the bag and into line 46. Once again, operation of the three-way dump valve 27 will allow application of air pressure from the air compressor 25a, through the line 29a, and of course into the pressurized mix container 43. The operation of the solenoid operated three way dump valve 33, as illustrated in FIG. 5, cuts off the air normally supplied by the valve 33 to the line 29c and check valve 34. By its position, it now is set as a "wash valve" which also now allows flushing with cleaning and/or sanitizing liquid and the like, the air check valve 34 and the mix check valve 48 merely by forcing cleaning and/or sanitizing solution through line 46, past tee 47, through lines 46a, 47a and the valve 33, into the barrel 26 and then into the freezing cylinder 17 through the product mix inlet 26c. As may be seen from the forgoing description, the "wash valve" on setting of the three way dump valve 33 enables easy flushing of the lines and valves normally exposed to the product mix with cleaning and/or sanitizing liquid While the three-way dump valve 27 may be located in the position shown in FIGS. 4 and 5 if a bag 44 is employed, if the liquid product mix is employed directly into the pressurized container 43, the dump valve 27 should be relocated to the pressurized container 43 so that the pressurized line into the container does not back up with mix, and become contaminated, when the air supply line gets dumped.

The cleaning and/or sanitizing liquid that is fed into the freezing cylinder 17 through the normal product mix inlet 26c, fills the freezing cylinder, and with normal operation of the dasher or beater 110, (which shall be described more completely hereinafter) with the refrigeration cycle cut off, and the product dispensing valve 60 open, the freezing cylinder 17, the door assembly 80 and dispensing valve 60 are all exposed to the cleaning and/or sanitizing liquid. As may be seen hereinafter, the door and valve construction are such as to facilitate proper cleaning action without undue operator attention.

FIG. 10 illustrates the manner in which the motor shaft 111 connects through an end cap 17c of the freezing cylinder 17. Because the freezing cylinder, when in operation, is under pressure due to the product mix being agitated by the dasher or beater 110, it is desirable that product be inhibited from entry into and along the shaft 111 and into the motor 25, through the shaft mounting housing or frame 141, which supports the motor 25 and the freezing cylinder 17 at one end by the end cap 17c. To this end, the shaft 111 is provided with a pair of longitudinally spaced apart, cylindrical, circumferentially extending of the shaft 111, flexible-wear resistant seals, 142, 143 respectively. As noted, the seals 142 and 143 are substantially wedge shaped in cross section, with their heal portions 144 adapted for receipt into circumferentially extending slots 145 in the bore 146 of the end cap 17c. As shown in FIG. 13B, each seal is angled so as to terminate at its forward end or bearing end 147 against the shaft 111, so as to form a knife-edge-like seal against the shaft.

Inasmuch as the seals 142 and 143 are composed of a flexible material, wearing of the bearing ends 147 against the shaft, and due to shaft rotation, is self compensating. In practice, the seals are preferably composed of a material that is food grade, i.e., will not deteriorate into the product and contaminate the same, are easily cleaned and have good wear characteristics. One such seal material and seal is a polyurethane of a food grade type, H-Ecopur manufactured by Eco Seal Tech, Inc. 26820 Fargo Ave., Cleveland Ohio.

In the event that some leakage or seepage does occur through the seal 142 into the space intermediate seals 142 and 143, means are provided to clean the seals and the space to prevent bacteriological material buildup and to prevent a consequent contamination source. Referring now to FIGS. 5 and 10, when the valve 33 is in the second position such that the air supply is interrupted between the needle valve 32 and the three way dump valve 33, cleaning and/or sanitizing liquid is supplied to the freezing cylinder 17 via check valve 48, while the two way valve 133 is being supplied with cleaning and/or sanitizing liquid via line 133a. When the valve 133 is open, such as shown in FIG. 5, the cleaning and/or sanitizing liquid is supplied through seal purging opening 148a via line 133b extending from valve 133. The liquid, of course, after purging the seals 142 and 143 and the space therebetween, may be disposed of through discharge opening 148b and drain line 149.

It should be recognized, of course, that the end cap 17c of the freezing cylinder 17 may be made integral with the housing or frame 141. In that instance, the cleaning and/or sanitizing inlet and outlet apertures 148a and 148b would reside in the frame or housing. As shall be described hereinafter, the freezing cylinder door assembly 80 and product valve assembly 60 are also constructed in a manner to allow for cleaning with cleaning of the freezing cylinder and the remainder of the system, without disassembly of the machine.

PRODUCT MIX LEVEL SENSING

The simple metering assembly provided above and as described and shown in the drawings also provides a method for sensing the level of product mix in the pressurized mix container 43. Whether the product mix within the container 43 is liquid in the container or in a mix bag or the like such as shown at 44 in FIG. 4, the method of determining the amount of mix in the container is determined by dumping or opening the three way dump valve 27 for a predetermined period of time, while monitoring the time and measuring, as through a suitable signal line to the control 55, the change in pressure for that period of time. The change in pressure is inversely related to the quantity of mix remaining in the tank. An alternate method is to open the three way dump valve 27 until the pressure drops to a predetermined level and measuring the time it takes to drop some predetermined pressure. In this case, the amount of time is inversely related to the quantity of mix remaining in the tank. This gives a good indication, by practicing this method at convenient times, to determine the level of mix remaining in the pressurized mix container 43 so that the operator may replace or add to the mix when needed.

However, while this level sensing method can be quite accurate, it does not indicate exactly when the tank is empty. Another method is thus employed to indicate to the operator that the mix has been depleted from the pressurized mix container.

To this end, an instrument, such as a probe and the like 51 is supplied to provide a feedback to the controls/control system 55 as by signal line 51a and give a positive indication to the operator that the mix has been depleted. As an example only, a thermister probe which protrudes into the barrel 26 may be employed. By energizing a thermister in the mix flowing in the barrel with a small electrical current, the resistance of the thermister causes heating. When mix is present in the barrel, and surrounds the probe or thermister tip, the thermal conductivity of the liquid mix rapidly dissipates the heating of the thermister. However, when the mix is depleted, the thermal conductivity surrounding the probe is reduced and the thermister heats up. This rise in temperature can be electrically sensed by the controls/ control system 55 since the resistance of the thermister is lowered with rising temperature. In this manner, the instrument detects the presence or absence of the liquid mix entering through the barrel 26.

DOOR AND PRODUCT DISPENSER

Figure 6:
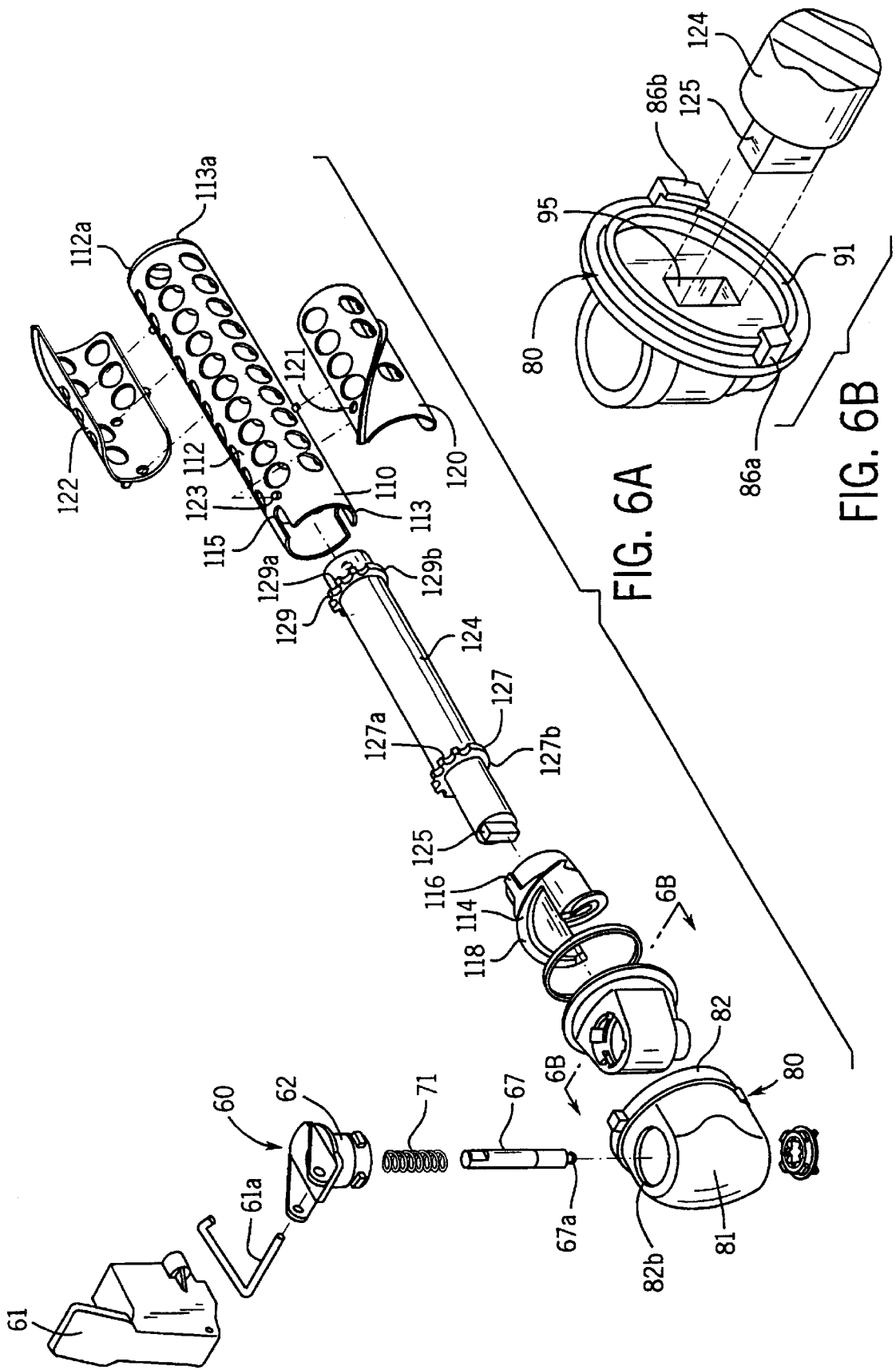
FIG. 6A is an exploded view illustrating a portion of a novel door assembly of the illustrated machine, and how it coacts with the baffle rod associated with the beater of the freezing cylinder as well as the housing of a novel valve assembly.
FIG. 6B is an enlarged, fragmentary perspective view of the interior of the door assembly shown in FIG. 6A with a receptacle therein to capture one end of the baffle rod to inhibit rotation thereof with rotation of the beater.
Figure 7:
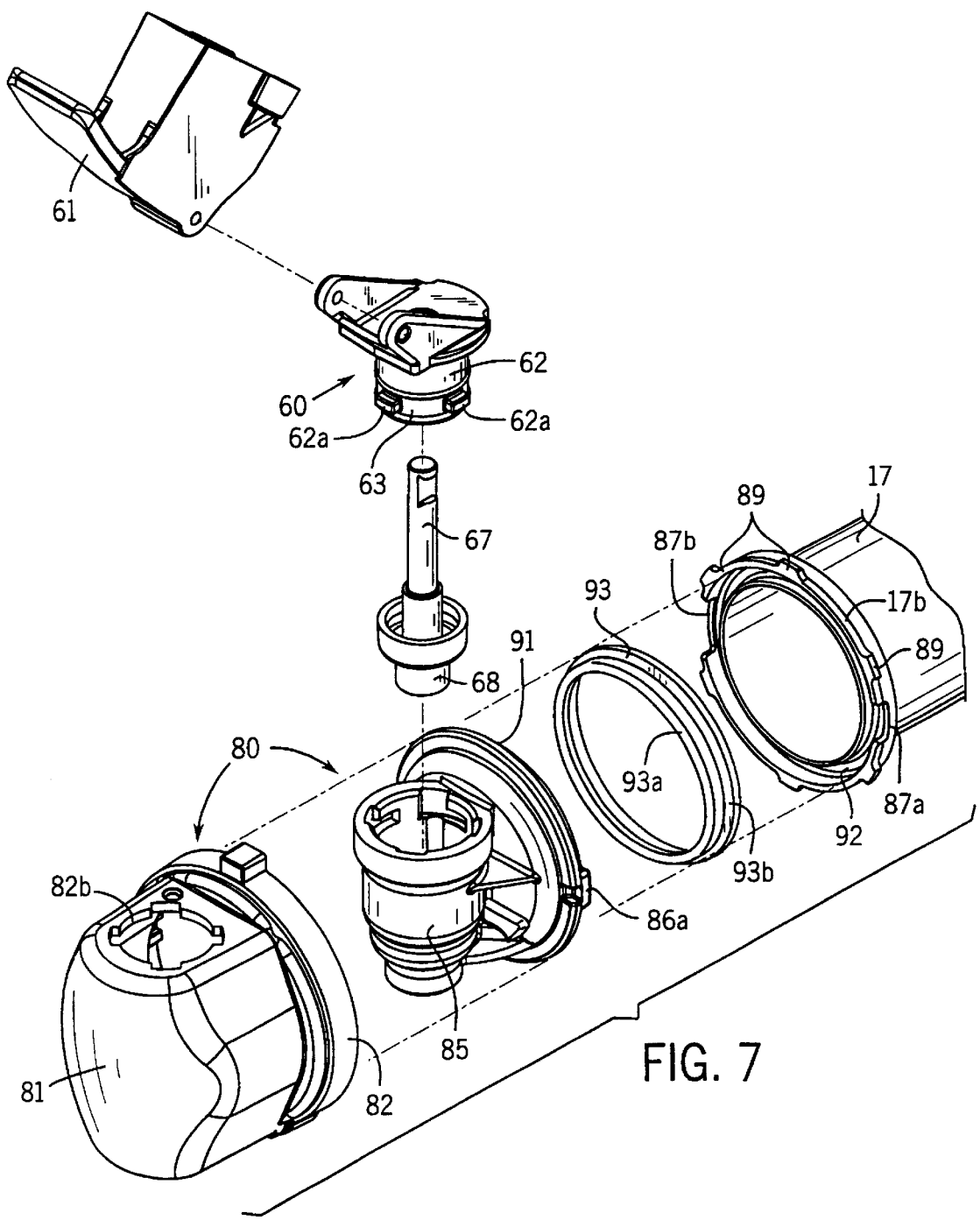
FIG. 7 is an exploded view illustrating the door assembly of the softserve machine and showing the parts necessary for proper mating coaction of the door with the freezing cylinder.

The door assembly 80 along with the product dispensing valve assembly 60, serves to lock and seal the one end 17a of the freezing cylinder 17. The door assembly 80, is shown in FIGS. 6–9, and includes a door 85 and cover 81. The door 85 is adapted to secure, upon accurate alignment against a radially projecting rim 17b of the freezing cylinder 17, with the cover 81 bearing against the door 85 and locked in place as by a ring 82, which may form part of the cover, plus an interlock provided by the product dispensing assembly 60. To this end, alignment of the door 85 onto the rim 17b of the freezing cylinder 17 is ensured, as illustrated in FIGS. 6 and 9, by projections or tabs 86a, 86b which project co-axially from the door 85 for mating insertion into receptacles or notches 87a, 87b in the rim 17b. As shown best in FIGS. 6 and 7, the tabs 86a and 86b as well as their associated receptacles or notches 87a, 87b are of different sizes to inhibit placement of the door in an upside down position. Of course, the projections or tabs 86a, 86b may be located on the rim and the notches or receptacles 87a, 87b may be located on the door, for a simple reversal of parts.

The ring 82 also includes radially extending slots or recesses 88 to grasp (see FIG. 9) and engage in locking fashion radially extending bayonet type locking tabs 89 on the rim 17b. Moreover, because of the construction of the cover 81, spaced from the door 85, a space 81a is formed intermediate the door and cover to form an insulator. Inasmuch as the various parts may be composed of a plastic, e.g., thin wall molded plastic parts, not requiring any secondary machining operation, the double walls and spaced apart walls of the cover and the door inhibit the formation of condensation.

In order to ensure a tight seal of the door 85 against the rim 17b of the freezing cylinder 17, and as shown best in FIG. 9, the door is provided with an annular projection 91 which is aligned with an annular receptacle 92 in the rim 17b of the freezing cylinder 17. A Z-shaped in cross section, seal 93, having radially depending legs 93a, 93b, is engageable with the rim 17b. To this end the leg 93b is fittable in the receptacle 92 to receive the annular projection 91 and to provide, when seated, a seal, in the illustrated instance a tertiary seal, i.e., an axial seal. The primary or initial seal is another axial seal formed by the leg 93a abutting a radial shoulder 91a underlying the annular projection 91. The secondary seal is a radial seal formed between the axial inner surface of the annular projection 91 and the portion 93c of the Z-shaped seal 93.

In practice, if the ring 82 is formed (molded) as part of the cover 81, the cover is rotated to allow proper mating of the cover to the locking tabs 89 on the rim 17b of the freezing cylinder, and then rotated in the opposite direction to effect a mating of the cover to the freezing cylinder. As illustrated best in FIG. 9 when the recesses 88 in the ring 82 are in engagement with the tabs 89 (FIG. 9), the cover presses against the door causing firm sealing and engagement of the annular projection 91 into the cup shaped cross sectional seal 93 forming a double axial seal and a radial seal therebetween. Once again, it is recognized that the annular projection may be placed on the rim and the receptacle and seal on the door in a simple reversal of parts.

In order to lock the cover to the door and the rim 17b of the freezing cylinder 17, and as best shown in the exploded view of FIGS. 2, 6, 7 and 9, the product dispensing or valve assembly 60, when placed within the door assembly 85, locks the body to the cover preventing inadvertent door opening or separation of the door from the freezing cylinder.

To this end, the valve assembly 60 includes a generally cylindrical receptacle member 62 which is fitted through a keyed aperture 82b in the cover 81. As shown, the receptacle 62 has a depending skirt portion 63 which is twist locked as by the radially extending tabs or projections 62a into recesses 83a in the bored hole 83 in the door 85. (see FIG. 9). A second receptacle 63a is placed in the bored hole 83 and twist locked as at 63b into position abutting the terminal end of the skirt 63 of the first receptacle 62. The second receptacle 63a also includes a flared depending annular skirt 64 including an annular cavity 65 therein. A piston 67 has a head end assembly 66 formed at the end of a shaft 67a. As shown, the head end assembly includes a diaphragm portion 68 which circumscribes the skirt 64 of the second receptacle 63a causing the diaphragm to be captured between the wall of the bore 83 and the skirt 64 of the second receptacle 63a. As the piston reciprocates due to actuation of the handle 61, affecting elevation of the shaft 67 about a pivot pin 61a, the rolling diaphragm 68 moves upwardly into the cavity 65 elevating the piston and head end assembly in a manner hereinafter described, and inhibiting the flow of product into the bore 83.

As illustrated, softserve product may pass from the freezing cylinder 17 into a passage way 69. As shown in FIG. 9, the valve dispensing head end assembly 66 intercepts the passageway 69 and seals off a product outlet 70 in the door. As shown in FIG. 9, the sealing end or piston head end assembly 66 forms an interference type fit against a beveled edge or seat 66a formed in the door adjacent the product outlet port or exit 70. As the shaft 67a is raised by rotation of the handle 61 about the pivot pin 61a, a biasing spring 71 causes, upon release of the handle 61 reseating of the valve head assembly 66 against the seat 66a sealing off the passageway 69 and the outlet 70.

To facilitate the opening of the valve 60, an actuator such as a solenoid 59 may be employed to permit the opening of the valve under control of the controls/control system 55. At this juncture in the description, it should be noted that the product exodus from the draw valve is such that product contamination of the valve, its actuator and operating mechanism is prevented because of the sealing action of the rolling diaphragm, facilitating the clean-in-place operation.

THE BEATER (DASHER) ASSEMBLY

Referring first to FIGS. 2, 6 and 10–13, the beater 110 comprises, in a first embodiment, a foraminous tube 112, which because of its construction is light, highly durable and possesses great torsional strength. A front, product pushing helical member or element, in the illustrated instance an insert 114 of the beater is dimensioned for insertion into one open end 113 of the tube 112, and includes oppositely situated, radially projecting or protruding keys 116 thereon for registration in slots or key ways 115 in the end 113 of the tube 112. As shown, the insert 14 includes a helix shaped front end 118 to facilitate the movement of the softserve product into the passage way 69 and out the outlet 70 of the door assembly. A plurality of blade scrapers 120, 122 are coupled to the exterior of the tube 112 in any convenient manner, in the illustrated instance by mating holes 121 and studs 123. If desired, the blade scrapers may be attached to the cylinder 112 by a key and notch arrangement which allows for engagement of each blade scraper to the cylinder 112. Alternatively, the blade scrapers may be of a snap-in design where no fasteners are required. This is acceptable (as in the arrangement shown in FIG. 6 where a simple stud and mating hole provide alignment of the blade scraper with the cylinder 112). The reason for this is that the blade scrapers, 120, 122, when in position with the cylinder 112 mounted in the freezing cylinder 117, cause the blades to press against the interior wall of the freezing cylinder 117 in scraping engagement therewith. In order that wear of the blades is compensated, and depending upon the material of construction, the blade scrapers or the blades thereon may be biased radially outwardly as by springs on the studs, or a leaf spring construction intermediate the cylinder 112 and the interior of the blade scrapers 120, 122 or even by mounting the blades as separate parts on the scrapers.

As shown best in FIG. 11, the blades on the blade scrapers form, when in position, a helix which is dimensioned for scraping engagement with the interior of the freezing cylinder for whisking softserve product from the cylinder as it rotates therein while simultaneously urging the softserve product towards the door or front end of the freezing cylinder. The driving portion of the beater 10 comprises a hub 112a with a keyway type connection for coupling to the shaft 111 and fittable into the opposite end 113a of the foraminous tube or cylinder 112 from the helical product pusher portion 114. (See FIGS. 10 and 13A)

By constructing the blade scrapers as well as the helical beater inserted in one end of the foraminous cylinder, of plastic, an improved beater or dasher assembly is provided.

To improve the mixing and blending of the product as it is frozen and with rotation of the dasher or beater 110, and as best shown in FIGS. 2, 6 and 12, a baffle rod 124 is mounted interiorly of the foraminous cylinder 112. To this end, the baffle rod 124 is fixed against rotation by a key 125 which coacts and mates with a receptacle 95 in the door assembly 80. (See FIGS. 6 and 9). The baffle rod 124 is eccentric with respect to the axis of rotation of the beater 110, the beater rotating concentrically of the axis of the freezing cylinder 117. By making the baffle rod 124 eccentric (or alternatively mounting it eccentrically of the foraminous cylinder 112), as the cylinder rotates, the baffle rod serves to fold and facilitate mixing of the softserve product as the product is moved within the freezing cylinder. Moreover, by making the baffle rod relatively large in diameter so as to consume more internal volume of the forminous cylinder 112, product waste is minimized when the machine usage is complete during the business day.

As shown best in FIG. 10, the opposite end of the baffle rod terminates in a protrusion 126 which abuts the end of the rotating shaft 111. Additionally, a flow interrupter, in the illustrated instance comprising a pair of spaced apart disks 127, 129 are mounted on the baffle rod 124, each of the disks having a scalloped peripheral edge portion 127a, 129a and a circumferentially extending smooth portion 127b, 129b respectively. The smooth portions 127b and 129b ride against the internal surface of the foraminous cylinder 112, maintaining the position of the baffle rod in the cylinder. The scalloped peripheral edge portions 127a and 129a, because of the flow of the mix through and around the holes in the foraminous cylinder 112 as it rotates, increases the mixing action of the product mix. As may easily be envisioned, the mix is forced forward towards the door assembly 80 by the helical action of the scraper blades and the pushing action of the helical portion 114. Subsequent mixing action occurs because the product mix tends to flow through the center of the foraminous cylinder 112, around the baffle rod and past the disks 127 and 129. This insures uniformity of the mix during the freezing cycle.

Figure 14A:
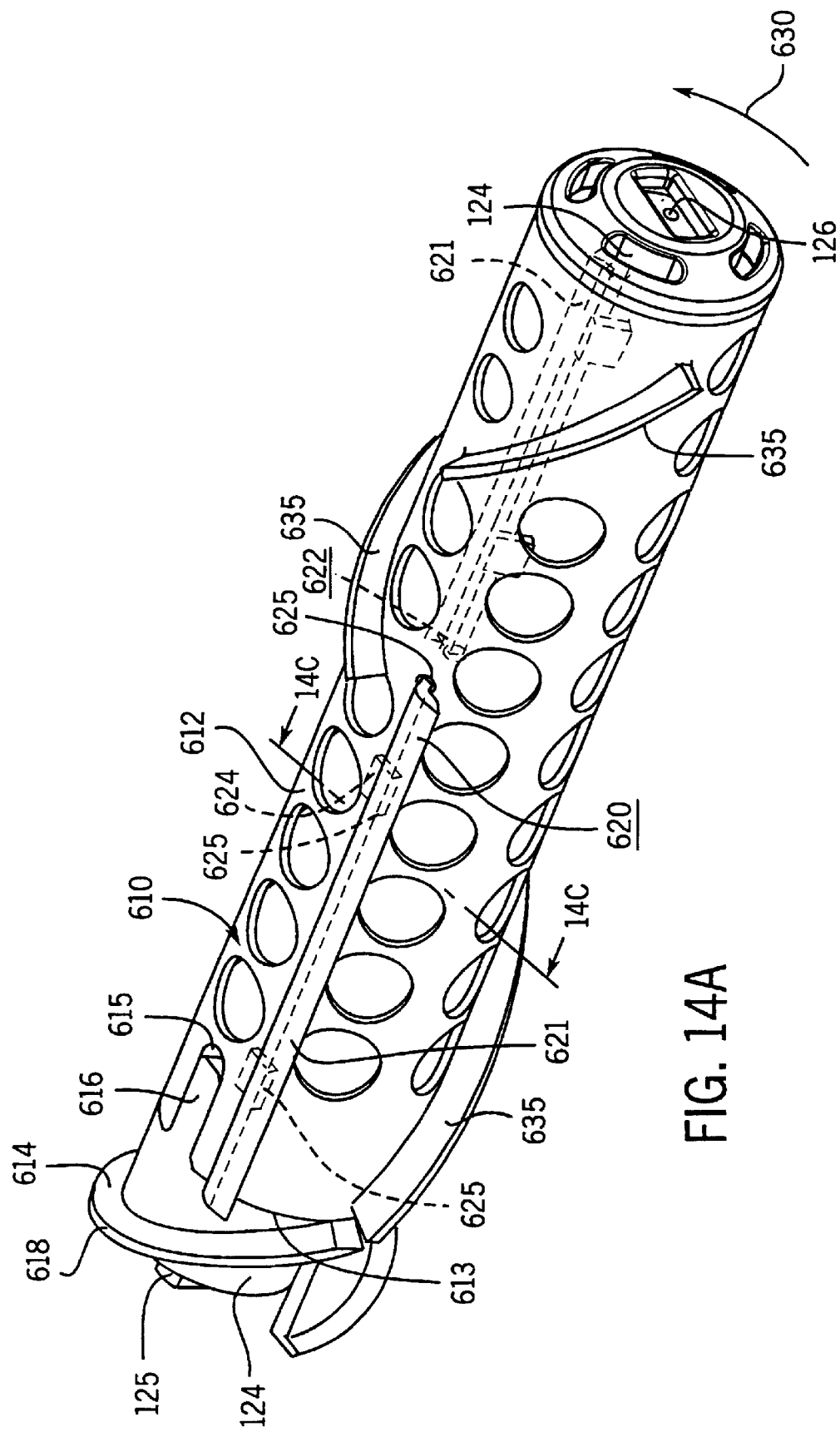
FIG. 14A is an enlarged, perspective view of another novel beater or dasher assembly constructed for advantageous operation in the softserve machine.

An alternative embodiment of the beater or dasher 610 is shown in FIG. 14A. In this construction, except for additional scraper blades 620, 622, a less expensive but durable construction of a beater is shown. In the present instance the foraminous tube 612, which because of its construction is light, highly durable and possesses great torsional strength is constructed of a molded or cast stainless steel. Similar to the embodiment of the dasher or beater 110 illustrated in FIG. 10, a front, product pushing helical insert member or element 614 is dimensioned for insertion into one open end 613 of the tube 612, and includes oppositely situated, radially projecting or protruding keys 616 thereon for registration in slots or key ways 615 in the end 613 of the tube 612. As before, the insert 614 includes a helix shaped front end 618 to facilitate the movement of the softserve product into the passage way 69 and out the outlet 70 of the door assembly (see FIG. 9). In distinction to the construction of the beater 110 shown in FIG. 10, the curved elements 635 form a broken helix along the periphery of the tube 612, but preferably do not contact the inner surface of the freezing cylinder 17 but serve, during rotation of the tube or cylinder 612, merely to facilitate mixing and movement of the freezing product mix towards the helical insert member or element 614 and out of the machine 1 during product draw. However, the scraper blades 620, 622 are mounted 180° apart, co-axially on the periphery of the tube 612. In a manner set forth below, the blades are mounted so that rotation of the tube or cylinder 612 in the direction of the arrow 630, causes product mix to gather beneath the blade, forcing it to rotate towards the interior of the freezing cylinder 17 and effect a whisking action of the freezing product mix material from the interior surface of the freezing cylinder. Additionally, the blades 620 and 622 have axial or longitudinal extents sufficient to whisk the desired working surface of the interior of the freezing cylinder 17.

A single scraper blade 620 is shown in FIG. 14B, and includes a plurality of tabs 624, 626, and 628. The tabs, as shown, are offset from the blade portion 621 of the scraper blade so as to permit easy placement into slots 625 in the surface of the tube 612, and so that when in position within the freezing cylinder, are allowed some freedom of rotation to accommodate product mix forcing the scraper blade outwardly against the freezing cylinder as shown best in FIG. 14C by the arrow 636. Moreover, by dimensioning at least two of the tabs differently and insuring that the mating apertures are dimensioned to only receive the mating tabs in one orientation of the scraper blade on the foraminous cylinder 612, it is impossible to fit the blades in the improper location. This difference in dimensions of the tabs 624, 626 and 628 is evident in FIG. 14B.

As before, the baffle rod 124 may be positioned interiorly of the tube 612 and operate in the same manner as heretofore described.

MODES OF OPERATION (STATE MACHINES & SOFTWARE)

Overview

In principle, the software for operation of the machine, via the controls/control system 55, may be structured around a time slicing kernel. However, the system should not be entirely a deterministic multi tasking system. Some functions of necessity are preferably operated interrupt driven, while others should be operated without interruption. While at first blush this would seem to complicate system design and operation, this approach to system design permits a building block approach and allows for subsequent alteration in the system with new features, when such is desired.

With the forgoing in mind, there are seven fundamental modes of operation of the softserve machine 1, all of which may be thought of as separate "state" machines. (It should be noted that a separate, or $8^{th}$ mode called "standby" is discussed briefly with regard to FIG. 15, but this mode is generally not considered a separate one, although it is treated as such herein, and discussed below.) FIG. 15 illustrates the basic state machine diagramming the general software structure and requirements for the fundamental mode of operation of the machine 1. As shown in FIG. 15, as that state machine diagram discloses, the machine 1 starts up by powering it up as at 200 (the control for such being, for example, located on the control and display panel 150, shown in FIGS. 1 and 2.). The machine, under command of the controls/control system 55, then goes into an "Off" mode in which the machine is in an idle state, but ready for operation and waiting for a further command, or goes into a "standby" mode, if such is commanded.

The "standby" mode is similar to the auto mode (described below) except that the product is held between the frozen condition and 40° F., (i.e., a cold liquid). This mode is employed during times when the product is thought not to be needed instantly, and allows for an increase in time between refrigeration cycles as well as reduced utilization of the dasher/beater. This mode is useful at times when it is doubtful that product will be demanded.

As shown by the state diagram in FIG. 15, there are several commands for operating the machine in a number of different modes that may be given. For example, the machine may be placed in a clean-in-place mode as at 240, or it may go into a beater mode in which the beater 110 is caused to rotate; or it can go into the auto mode which commences charging or priming the freezing cylinder 17 with mix from the mix cabinet 40 and container 43 as indicated by the block 260. When the machine enters the beater mode as at 220, it is really in the powered up mode, the beater 110 is turned on as by the motor 25, the air compressor 25*a* may be started and the air pressure may be brought up to a normal operating pressure so as to pressurize the mix container 43. While such pressure is dependent upon multiple system parameters, an air pressure of approximately 5 psi has been found to work well.

Assuming that the machine has entered into the prime mode 260, and the barrel or freezing cylinder 17 was initially empty and is in the process of being charged with a liquid mix product, once the mix is at some predetermined minimum level, the initial freeze down mode as at 262 may commence. Once the product has been frozen and is ready for serving, the machine state is transferred to the product ready mode 264. In this mode, several actions may occur. For example, a product draw may take place (i.e., the product handle 61 dispenses through the product dispensing valve 60, semi frozen/softserve product). Once a draw occurs or the product starts getting warm, or a selected amount of time elapses, the machine state switches to a product maintenance mode as at 266. In this mode the product is maintained at a desired quality level both as to temperature, mixture of air therein, etc.

When the product has been maintained at some predetermined desired level, the machine state switches back to the product ready mode 264 and cycling continues. If no draw has taken place, and a predetermined period of time has elapsed, e.g., 15–20 minutes, (which may be settable as desired), the product needs to be re-frozen and re-blended so the control 55, under software direction, will switch the machine back to the product maintenance mode 266, correct the deficiencies in the product quality, and bring the machine back to the product ready mode 264. In the event that the product ever gets too warm in the freezing cylinder, for example if the machine happens to be positioned adjacent a deep fat flyer at 140 degrees and time doesn't elapse, a sensor in the freezing cylinder may effect a shift of the machine to the product maintenance mode 266 via the control 55.

Power-up Mode

Figure 16:
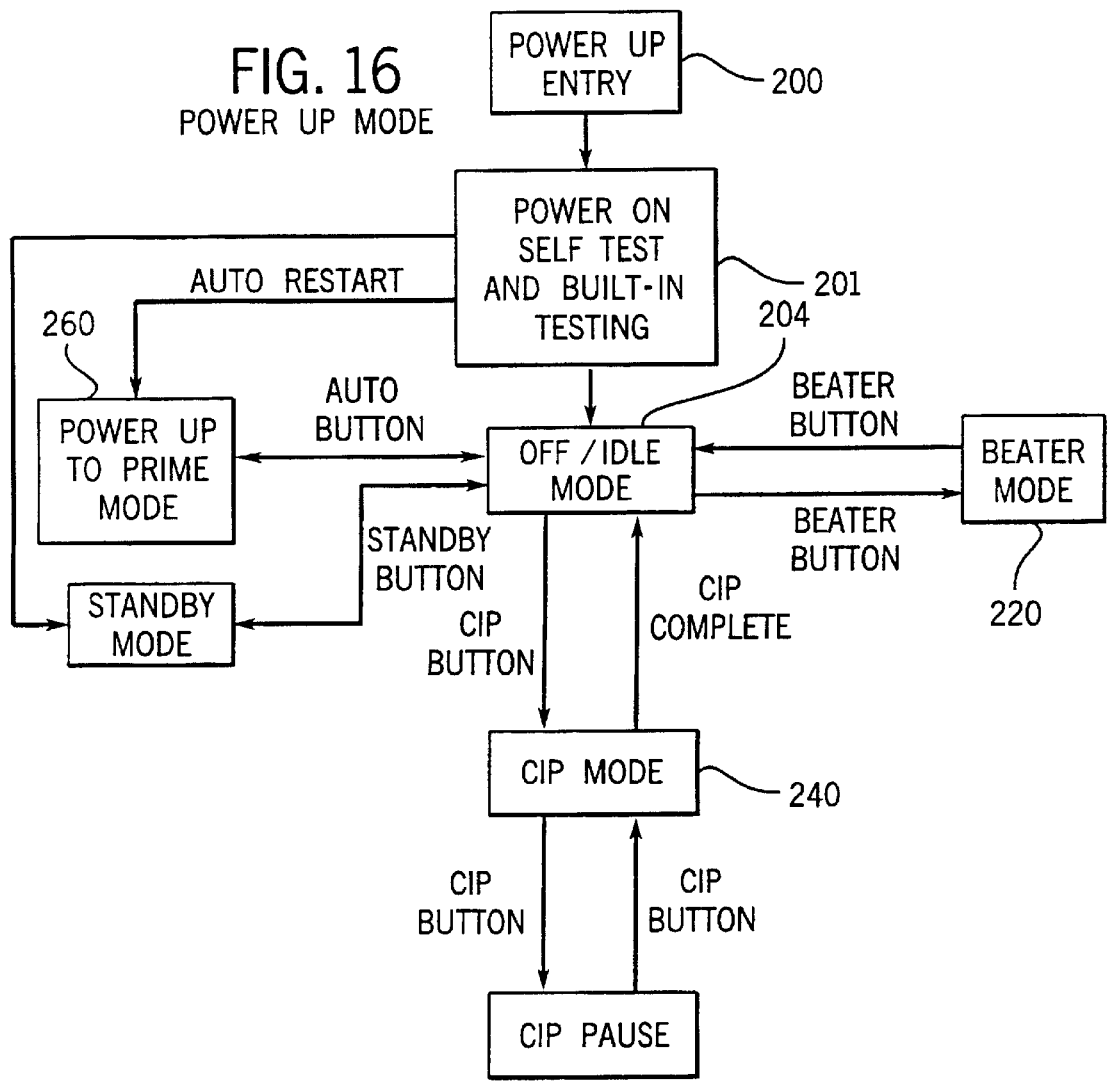
FIG. 16 illustrates a state diagram of the power-up mode of the softserve machine.

Turning now to FIG. 16, a state-diagram of the power-up mode of the softserve machine 1 is illustrated therein. In this mode, the control 55 first checks itself with a POST (Power On Self Test) 201 to insure that the system is present and has the ability to function. This test is conducted only at power up. Other tests, such as BIT (Built In Test) are tests that may be conducted not only at power up, but periodically during operation. Many of these tests are similar or the same as those conducted during start up and operation of a personal computer. Some of the tests would include short and open tests on temperature sensors; peripheral inquiry via the RS-485 bus (which bus shall be described relative to FIG. 23); memory tests, both RAM & ROM; indicator bulbs/ LED's; alarm & other indicators, and interlocks, (e.g., the interlock on the door 40a of the refrigerated auxiliary mix storage cabinet 40).

As is conventional, the parameters of the operation may be retrieved from data contained in non-volatile memory and employed in software contained in the control 55. For example, the software may analyze the temperatures within the machine and determine what state the system was in when power was removed, and allow, if conditions permit, for automatic restart. In the event the machine 1 is empty, i.e., no pressure sensed in the mix feed to the freezing cylinder or barrel 17, then no recovery is necessary and the machine awaits the command from the operator to press the "Auto Button". (As shown in FIG. 16, several "Buttons" are designated, e.g., "Auto Button", "Beater Button", "Stand By Button" and "CIP Button" (Clean-In-Place initialization). Each of these buttons may be placed, for example, on the control and display panel 150, illustrated in FIGS. 1 and 2. If the machine is not empty, that is a pressure greater than 0 psi is detected, and the mix cabinet 40 temperature is above a predetermined temperature, e.g., 45 degrees F., an alarm/ indicator/light, etc. may be activated on the panel 150 to warn the operator that the product has become too warm to be re-frozen safely. To start operation, the operator may then use the "Auto Button". The indicators for "pressure in the system" or "over temperature" may take any convenient form that will alert the operator that the system is pressurized or the product mix exceeds maximum allowable temperature for re-freezing. If the machine is not empty (i.e., pressure greater than 0) and the product is within normal temperature range (e.g., 20 degrees F. or less), then the machine will return to its product ready mode 264. Alternatively, if the machine is not empty (pressure>0 p.s.i.) and the product mix temperature in the freezing cylinder is within safe limits (e.g., greater than 20 degrees but less than 40 degrees F.), the software forces the machine into the product maintenance mode 266 in which an attempt is made to re-freeze the product and then return the machine to the product ready mode 264. The clean-in-place mode 240 is also, as is explained above, is entered into from the off or idle mode 204. Its operation will more fully be explained with regard to FIG. 21, hereinafter.

Prime Mode

Figure 17:
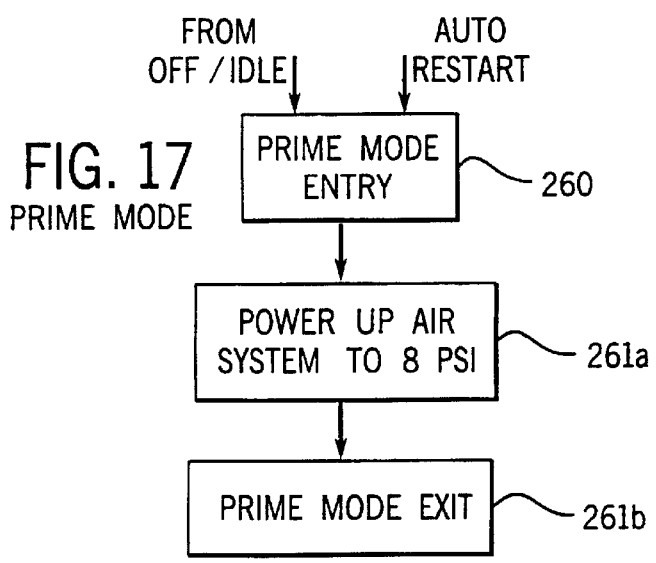
FIG. 17 is a state diagram illustrating the priming mode in which raw product is first brought into the machine.

Referring now to FIG. 17, a diagrammatic view of the prime mode is illustrated. During the prime mode, several activities under software control occur simultaneously. First and foremost, air pressure serves to prime the freezing cylinder with the raw product mix. Simultaneously, the control 55 monitors the system to insure that all other dependent systems are operating properly. For example, that pressure in the freezing mixture and the freezing cylinder is rising; that the temperature in the freezing cylinder 17 is decreasing; that the mix level in the freeze cabinet is within operating limits; that enunciators or indicators are updated; that all operator inputs are read; and that all safety features are operating safely within design limits. As the air pressure is monitored, when the pressure reaches some predetermined level, for example, 8 p.s.i, as shown in block 261a, it will be understood that the priming operation is complete and the prime mode is exited as at block 261b. Thereafter the initial freeze down mode is completed.

Freeze Down Mode

Figure 18:
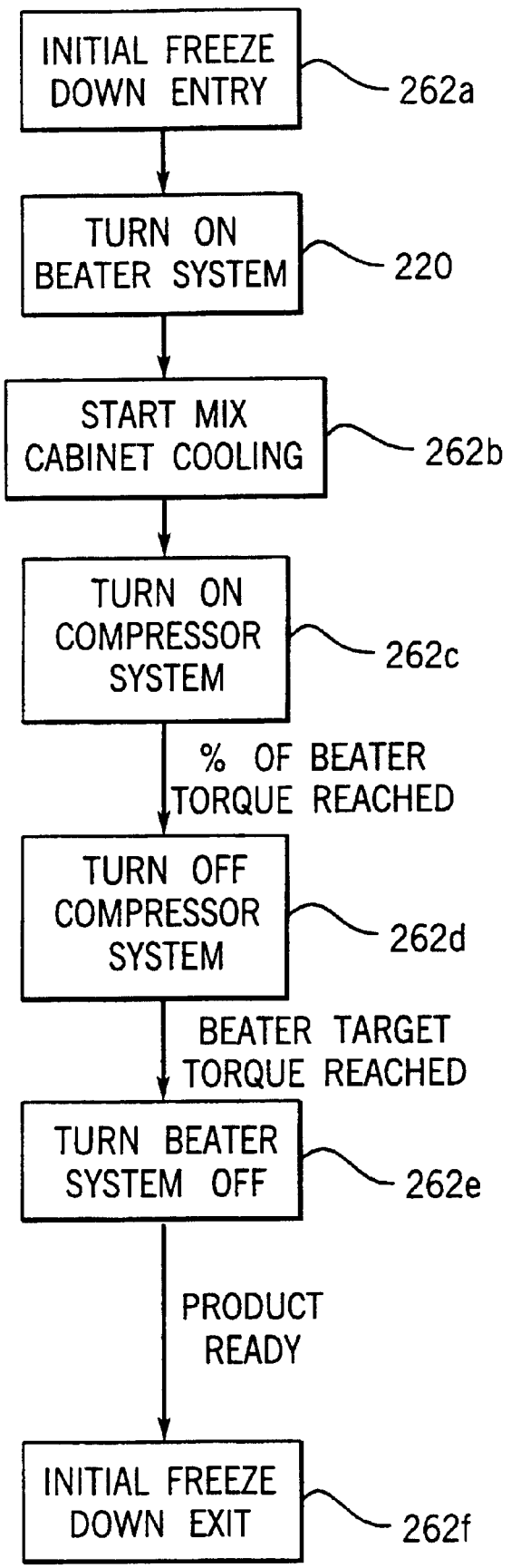
FIG. 18 is a state diagram illustrating the initial freeze down mode in which the raw product is frozen for the first time.

Turning once again to the drawings, and especially FIG. 18, FIG. 18 is a state diagram illustrating the initial freeze down mode in which the raw product is frozen for the first time. Assuming that the system is primed with product, the initial freeze down mode is then commenced, as shown at block 262a. The beater system 220 is activated and the beater or foraminous cylinder or tube 112 is rotated. When the initial freeze down is completed, it is desirable that mix cabinet 40 starts to cool the supply of product mix in the mix storage cabinet 40. In this connection, and referring to FIG. 3, the solenoid valve 21 is opened and mix cabinet cooling is commenced, as depicted in block 262b. The refrigeration compressor 18 is then energized to start the refrigeration system. This activity is depicted at block 262c. The control algorithm for the refrigeration system is such as to maintain the optimum evaporator pressure, given the current operating environment. In the interim, the controls/control system 55 are monitoring the system, for example, all temperatures, system pressures, current and voltages of the motors etc. It should be recognized that each of the control lines, although being shown as single lines, may in fact included multiple electrical leads to and from the controls/control system 55. For example, through control line 25b, current being drawn by the motor 25 may be measured to determine the amount of torque transmitted to the beater as it rotates through increased resistance of product mix in the freezing cylinder 17. When some predetermined percentage of the torque required to effect rotation of the beater when the freeze down is completed, and that percentage is measured or calculated, the refrigeration compressor 18 is turned off, such as shown in block 262d. This is done to prevent over freezing of the product in the freeze cylinder 17, and allow residual cooling to finish the freeze down. When the measured or calculated torque reaches the amount of torque required to effect rotation of the beater when freeze down is completed, the beater system is turned off, such as shown at block 262e. The softserve product is then ready and the initial freeze down mode is exited, as shown at block 262f. It is recognized that the means for determining the finishing point of the softserve product may take any number of forms, from temperature to actual consistency of the product, on a test basis. However, by measuring torque, a simple and repetitive mode of operation may be consistently applied.

In the event a product draw is attempted before the product reaches a predetermined frozen consistency, an aural/visual indication may be provided from/on the control and display panel 150. Moreover, if the measured air pressure drops below some predetermined number (e.g., 5 psi) due to the draw down, the coolant compressor 18 may be shut down to temporarily cease the freezing activity, and may be turned on again when the air pressure reaches, for example, 8 psi.

There are other conditions which should produce warnings or shut the system down. For example, if liquid refrigerant is fed back to the refrigeration compressor 18, to prevent refrigeration system damage, the system should be shut down. Other conditions which should be detected and the initial freeze down mode exited, are if the product low temperature trip point is reached, or if the refrigeration compressor is on for greater than some definitive time, e.g., 10 minutes with the draw is handle 61 closed; or if the beater is unable to reach torque after some predetermined period of time, e.g., 12 minutes.

Product Ready Mode

The product ready mode is depicted in FIG. 19. As has been explained heretofore, once the product has been frozen and is ready for serving, the machine state leaves the initial freeze down mode, as discussed relative to FIG. 18, and the machine state is transferred to the product ready mode 264 (FIG. 15), as by a signal indicating that the product is ready, as at product ready entry block 264*a*. In this mode the product is at the required quality level. The system uses passive cooling during this time to keep the product at this level for as long as possible. In this mode, several actions may occur. In the first instance, the control 55 must continuously monitor the system status, such as shown at block 270. (The looping line 271 is to indicate the monitoring or looping action of the software controlled control 55). For example, a product draw or draw down may be anticipated as by a draw down proximity detector which senses the approach of an operators hand to the draw down handle 61. Upon sensing the approach of a hand to the product draw down handle 61, the beater motor 25 may be activated as at block 220. Once the draw switch or solenoid 59 is energized, the product ready mode exits to the draw mode 272, and the product handle 61 causes semi frozen/softserve product to be dispensed through the product dispensing valve 60. Once a draw occurs or the product starts getting warm, or a selected amount of time elapses, the machine state switches to a product maintenance mode as at 266 and the cabinet temperature, for the product mix, at some point requires active cooling. In this mode the product is maintained at a desired quality level both as to temperature, mixture of air therein, etc.

When the product has been maintained at some predetermined desired level, the machine state switches back to the product ready mode 264 as at 264*a* and cycling continues.

Product Maintenance Mode

In order that the quality of the product is maintained, it is necessary that the machine enter into a product maintenance mode 266 (see FIG. 15) so that if the product temperature, monitored by the control 55, exceeds a predetermined limit, or the product has been allowed to sit in the barrel too long and needs to be refrozen and air reincorporated, the machine, under control in this mode, accomplishes all of these things by maintaining the product at a desired quality level both as to temperature, mixture of air therein, etc. When the product has been maintained at some predetermined desired level, the machine state switches back to the product ready mode 264 and cycling continues.

To this end and referring now to FIG. 20, product maintenance entry 266*a* is a block representation of the entrance into the maintenance mode 266. For example, suppose the product temperature in the freezing cylinder 17 has exceeded some predetermined limit, as determined by differing stored setpoints and control variables in the control 55. Under these circumstances, the software will load the variables, as at 267, for commencing the restoration of the product to the desired quality level. In this connection, the beater system 220 is activated and the beater or foraminous cylinder or tube 112 is rotated. It is desirable that mix cabinet 40 starts to cool the supply of product mix in the mix storage cabinet 40. As discussed heretofore, and referring to FIG. 3, the solenoid valve 21 is opened and mix cabinet cooling is commenced, as depicted in block 262*b* (FIG. 18). The refrigeration compressor 18 is then energized to start the refrigeration system. This activity is depicted at block 262*c*. In the interim, the controls/control system 55 monitor the system, for example, all temperatures, system pressures, current and voltages of the motors, etc. As described heretofore with respect to the freeze down mode depicted in FIG. 18, the refrigeration compressor 18 is run until a predetermined percentage of the torque required to effect rotation of the beater when the freezing of the product is completed. The refrigeration compressor 18 is then turned off, such as shown in block 262*d*. Residual cooling is then permitted to complete the freeze down. When the measured or calculated torque reaches the amount of torque required to rotate the beater when freeze down is completed, i.e., beater target torque is reached, as at 262*e*, the beater system in turned off. The product maintenance mode may then be exited as shown in product maintenance exit 290 when the product quality setpoints are reached.

Product maintenance also occurs upon product draw, when the variables and setpoints for product draw for the software take place as at block 268, or; if too much time has elapsed as at block 269, or the control indicates (through the software) that the variables for the mix cabinet 40 must be loaded to effect active cooling thereof In each of those events, the beater system is turned on as at 220, the refrigeration compressor 18 is turned on (block 262*c*) and later turned off (block 262*d*) when some percentage of beater final torque is reached, and then finally, the beater system if turned off as at 262*e*. Once again, the product maintenance mode may then be exited as shown in product maintenance exit 290, when the product quality setpoints are reached, and the product ready mode 264 may be entered.

Clean-in-place Mode (CIP)

As has been explained heretofore, it is highly desirable that the amount of disassembly of the machine in order to clean it, be minimized. As discussed in the section of this specification entitled "Clean-In-Place", the machine 1 is equipped with clean-in-place apparatus which allows for cleaning of the machine with minimal human attention. To refresh the readers recollection, and referring first to FIG. 5, when it is desirable or necessary to clean the product containing portions of the machine 1, the pressurized mix container may be provided with a quantity of cleaning and/or sanitizing liquid. The mix container is pressurized and the cleaning and/or sanitizing liquid is ejected through line 46 and therefore ultimately to the freezing cylinder 17. Pressurization of the mix container 43 occurs because the operation of the three-way dump valve 27 will allow application of air pressure from the air compressor 25a, through the line 29a, and of course into the pressurized mix container 43. The operation of the solenoid operated three way dump valve 33, into the position illustrated in FIG. 5, turns that valve into a wash valve which cuts off the air to the line 29c and check valve 34. By its position, it now flushes or washes with cleaning and/or sanitizing liquid, the air check valve 34 and the mix check valve 48 merely by forcing cleaning and/or sanitizing solution through line 46, past tee 47, through lines 46a, 47a and the valve 33, into the barrel 26 and then into the freezing cylinder 17 through the product mix inlet 26c.

As may be seen from the forgoing description, the cleaning and/or sanitizing liquid enables easy flushing of the lines and valves normally exposed to the product mix.

The cleaning and/or sanitizing liquid that is fed into the freezing cylinder 17 through the normal product mix inlet 26c, fills the freezing cylinder, and with normal operation of the dasher or beater 110 causing agitation of the cleaning and/or sanitizing fluid within the cylinder 17, with the refrigeration cycle cut off, effects purging of the freezing cylinder. When the product dispensing valve 60 opens, the freezing cylinder 17, the door assembly 80 and dispensing valve 60 are all exposed to a flushing action because of the flow of the cleaning and/or sanitizing liquid therethrough.

Figure 21:
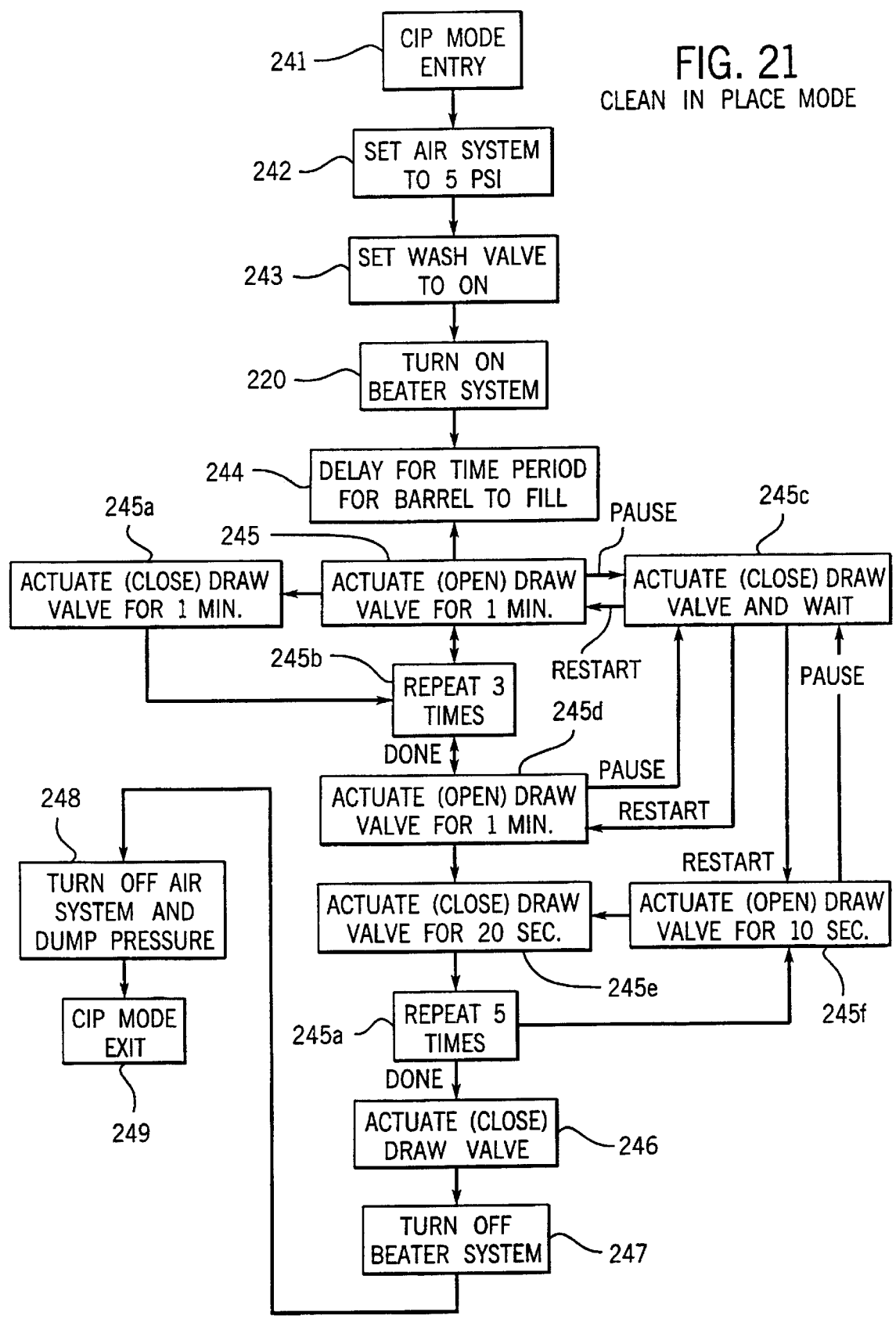
FIG. 21 is a state diagram illustrating the softserve machine in a clean in place mode.

The sequence of operations and the mode of operation is depicted in FIG. 21. Turning now to that drawing figure, the CIP mode is entered into by the operator command as at block CIP MODE ENTRY 241. This can be accomplished by a simple switch or control on the control and display panel 150. Upon entry into the CIP mode 240, the air compressor outlet is adjusted to some finite level, e.g., 5 psi, such as depicted at block 242 in FIG. 21. This effects pressurization of the mix container 43. Simultaneously, the dump valve 33 and the valve 133 is moved to the position illustrated in FIG. 5, and depicted by the block 243 (set wash valve to on) in FIG. 21, and those valves now serve as a wash valve for permitting cleaning and/or sanitizing fluid into both the freezing cylinder 17 and the into the seal inlet 148a (for cleaning and/or sanitizing the space intermediate the shaft seals as well as the seals themselves). The beater system is then turned on as shown in block 220. The system is then preferably placed in a hold or delayed state 244 for some predetermined period of time, depending upon the barrel 26 and freezing cylinder volume as well as cleaning and/or sanitizing liquid flow, for example for a few minutes, while the barrel 26 and freezing cylinder 17 are filled with the hot cleaning and/or sanitizing liquid.

In order that the lines, barrel 26, freezing cylinder 17, product dispensing valve assembly 60 may be properly purged of any food product mix, the beater 110 is kept in motion. Moreover, a cycling action is then instigated by the software to repetitively open the product dispensing valve 60, i.e., under control of the solenoid 59 and operation against the handle 61 of the valve 60. Return of the handle 61 to its closed position is effected by the return spring 71. This permits hot cleaning and/or sanitizing liquid to flow through the system and be dispensed out of the product outlet 70. (See FIG. 9). By cycling (opening and closing of the product dispensing valve 60), for predetermined periods of time, the entire system may be purged and cleansed. Moreover, by cycling the system for differing time periods, differing and varying pressurizations, rarefactions, surging and purging actions (sloshing) are set up within the system which tend to dislodge any stubborn or difficult to dislodge food particles. While these time periods may be varied, and their number altered dependent upon experience with different products, the cleansing of the system is assured by the cyclical action. This action is best illustrated in FIG. 21 as in blocks 245, where the product draw valve is opened for an exemplary time period of 1 minute, closed for 1 minute as in block 245a, and the action is repeated three times as shown in block 245b. This sequence of repetitive cycling actions for exemplary differing time durations or periods is depicted in blocks 245c–245g. It should be noted that these time periods and sequencing actions are by example only, and proper and complete cleansing of the machine 1 product side are dependent upon cleaning and/or sanitizing liquid composition, temperature, volume and pressure as well as the retentiveness, ability to break down into its constituent parts, the food product itself.

The product draw valve 60 may then be finally closed as shown at block 246, the beater system 110 turned off as at block 247, the air pressure turned off and pressure dumped as at block 248 and the clean-in-place mode exited as at 249.

CONTROL 55 OR CONTROL SYSTEM 550

The control or control system 55 is the hardware system that operates in conjunction with and under control of the software to effect the modes of operation described in the section of this specification entitled "MODES OF OPERATION (State Machines & Software)".

Figure 22:
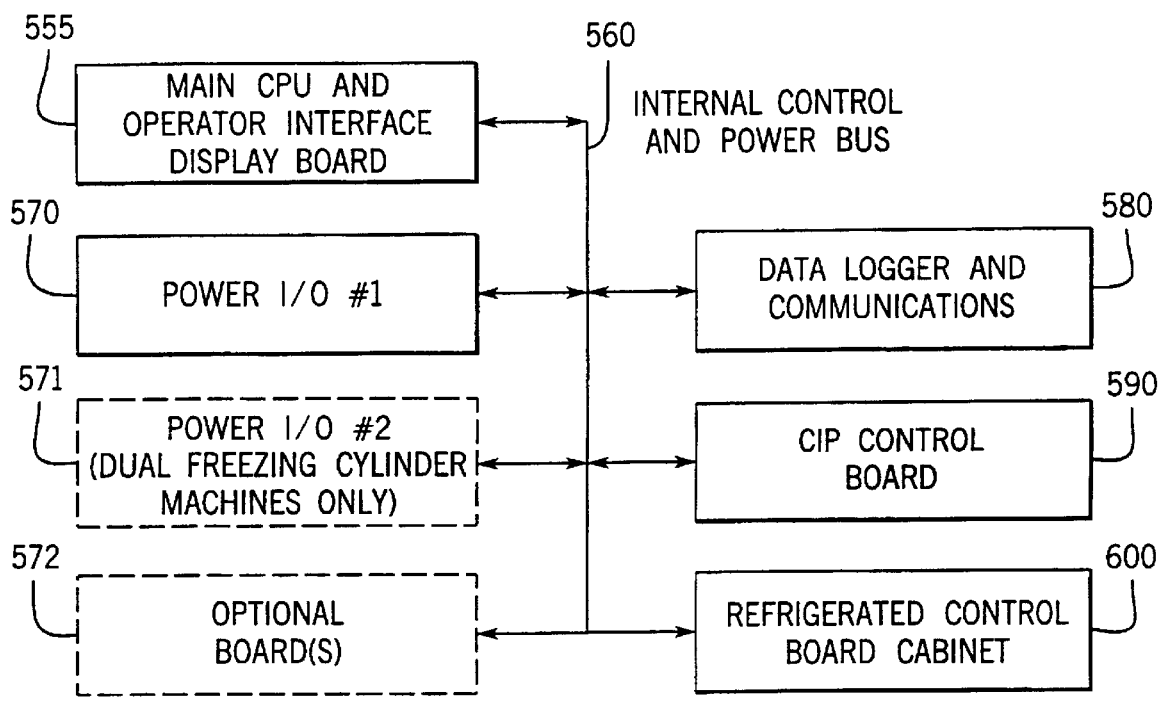
FIG. 22 is a block diagram of the overall system for controlling the operation of the machine in the various states depicted in FIGS. 15–21.

Turning first to FIG. 22, the control system 550 comprises, at a fundamental level, a main CPU and operator interface display board or main control board 555, and one power I/O board 570. These two components are coupled by an RS-485 serial data bus 560. The power I/O functions as a slave to the main CPU. When the system is expanded, for example into a dual freezing cylinder machine, a second power I/O board may be added such as shown in dotted lines at 571. Of course when additional options are desired for the system, such as shown in the dotted line block Optional Board(s) 572, additional slave boards may be installed on the RS-485 data bus to ascribe specialized I/O required for a desired particular function. Other boards coupled to the RS-485 serial Data bus 560 include a data logger and communications boards 580, a clean-in-place (CIP) control board 590 and a refrigerated control board 600 for the mix cabinet 43.

Figure 23:
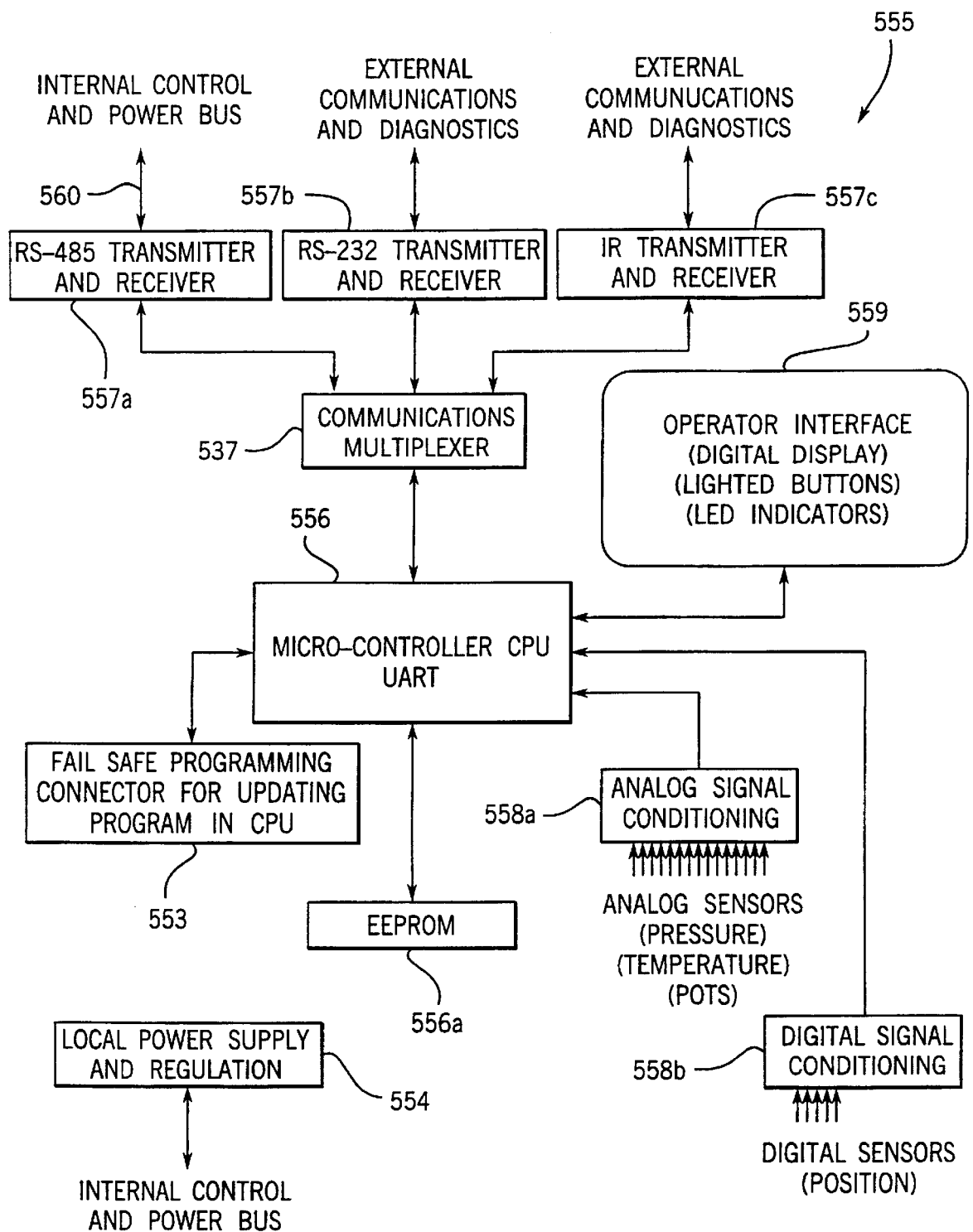
FIG. 23 is a block diagram of the main system control board.

The main control board 555 is illustrated in FIG. 23 and is constructed around a controller, in the illustrated instance a micro-controller/CPU 556 such as a Hitachi H8 micro-controller. The advantage of this particular micro-controller is that it contains Flash ROM for the application program, system RAM (random access memory), analog to digital (A/D) converter, digital I/O ports and a built in communications system. However, other processors and/or microprocessors may be employed with suitable peripheral devices and architecture to accomplish the necessary functions. In the illustrated instance, external to the micro-controller 556 is an EEPROM 556a which is used to store calibration, setup, configuration and fault data. Externally of the A/D converter is an analog multiplexer 557 and analog and digital signal conditioning circuits 558a, 558b respectively, that interface various analog logic sensors (pressure, temperature with associated potentiometers) and digital sensors (e.g., positioning sensors) to the micro-controller 556. The communications multiplexer 557 includes suitable driver circuits that allow the system to interface with various standard communications protocols, e.g., the RS-485 transmitter and receiver 557a for internal CPU board control of the bus 560; an RS-232 transmitter and receiver 557b for external communications and diagnostics and, if desired, an infra red (IR) transmitter and receiver 557c which permits wireless, short range, infra-red light communication, also for such things as data and diagnostics.

The operator interface 559 is machine dependent and my be visually interfaced to the operator as at the control and display panel 150 (see FIGS. 1 and 2). The interface may provide the operator with I/O push buttons, enunciators (lighted icons), digital displays, LED indicators and the like. As shown, the CPU board 555 may be provided with its own local power and DC voltage regulation as at 554, and also provided with a "fail-safe" programming connector 553 which allows updating the application within the micro-controller 556. It should be recognized, however, that in normal operation, updating may occur through and by way of the RS-232 transmitter and receiver 557b and/or the IR transmitter and receiver 557c.

Figure 24:
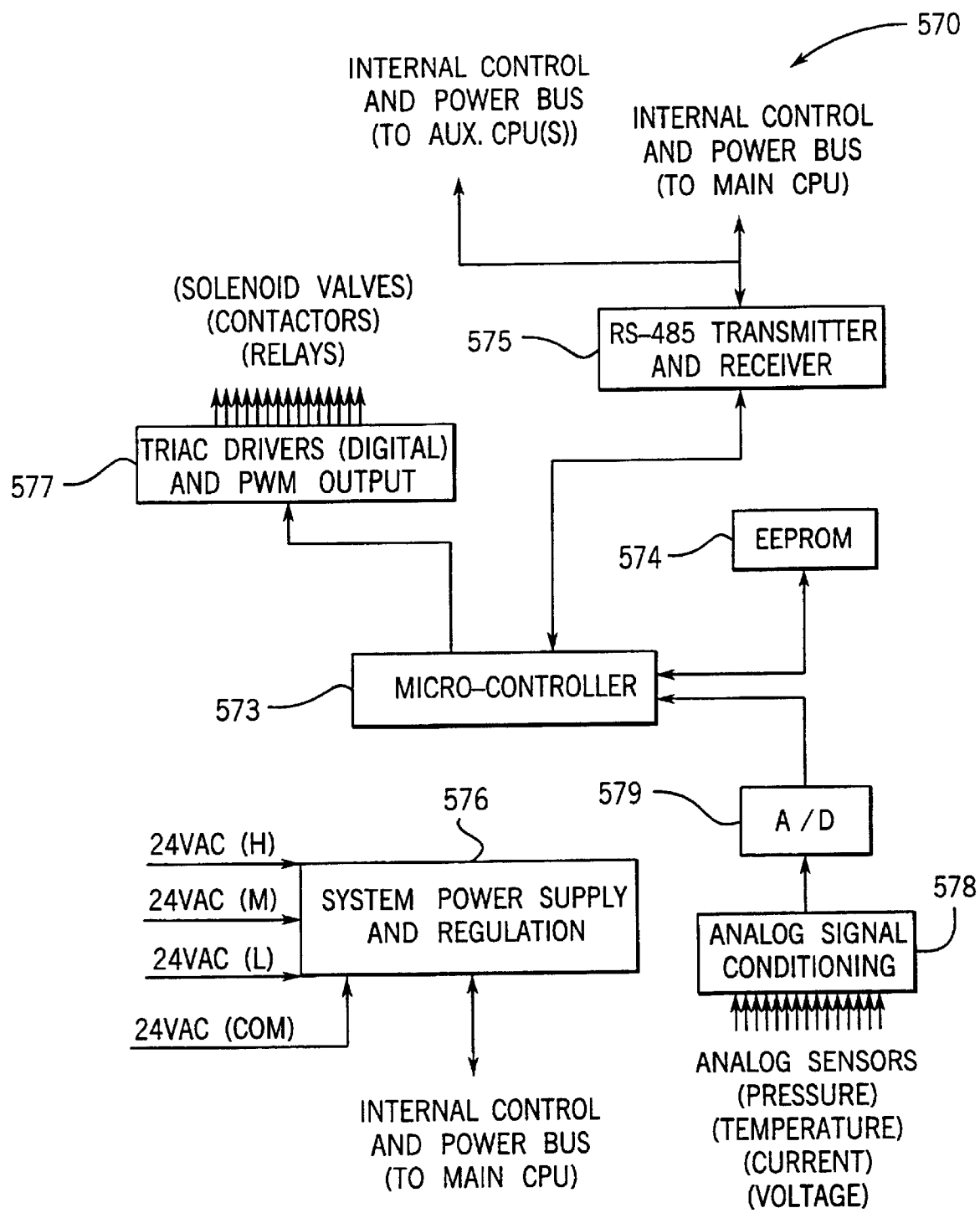
FIG. 24 is a block diagram of the input/output board for controlling the power supplied to various boards in the system.

The power I/O board 570 may be a plug in or insertable daughter board for the main control board 555, but is preferably of a distributed control architecture where the processors are situated close to their actuators or sensors which they control. Turning now to FIG. 24, at the heart of the power I/O board 570 is a micro controller 573. While the micro-controller may take numerous forms, for example comprise an Intel or AMD type processor with various supporting chip circuitry, a Motorola HC11 class Micro-controller is an excellent choice. The HC11 contains ROM for the application program, system RAM, digital I/O and a communications system. On the board (if desired) and external to the particular micro controller chosen, is an EEROM 574, which may be employed to store calibration, setup and configuration data. External to the communications system is a multiplexer and driver circuit, e.g., an RS-485 transmitter and receiver 575 that allows the system to interface with other RS-485 devices on the main control board 555 and internal control and power busses on other slave or daughter boards connected to the system. As the name implies, the power I/O board also includes the system power supply and regulation module(s) 576 which rectify, filter and regulate selected line voltages (e.g., 24V A.C.) into usable DC power for the entire system. Also, connected to the digital I/O of the micro controller 573 are TRIAC driver circuits 577 that switch the control voltage (e.g., 24V A.C.) to the various contactors, relays and valves in the system, and supply, as necessary, a pulse-width-modulated (PWM) output. For monitoring the system power fundamentals, i.e., pressure, temperature, voltages and current, an analog signal conditioning circuit 578 applies analog signals to an analog to digital (A/D) converter 579 which in turn applies monitored and converted sensor information to the micro controller 573.

Figure 25:
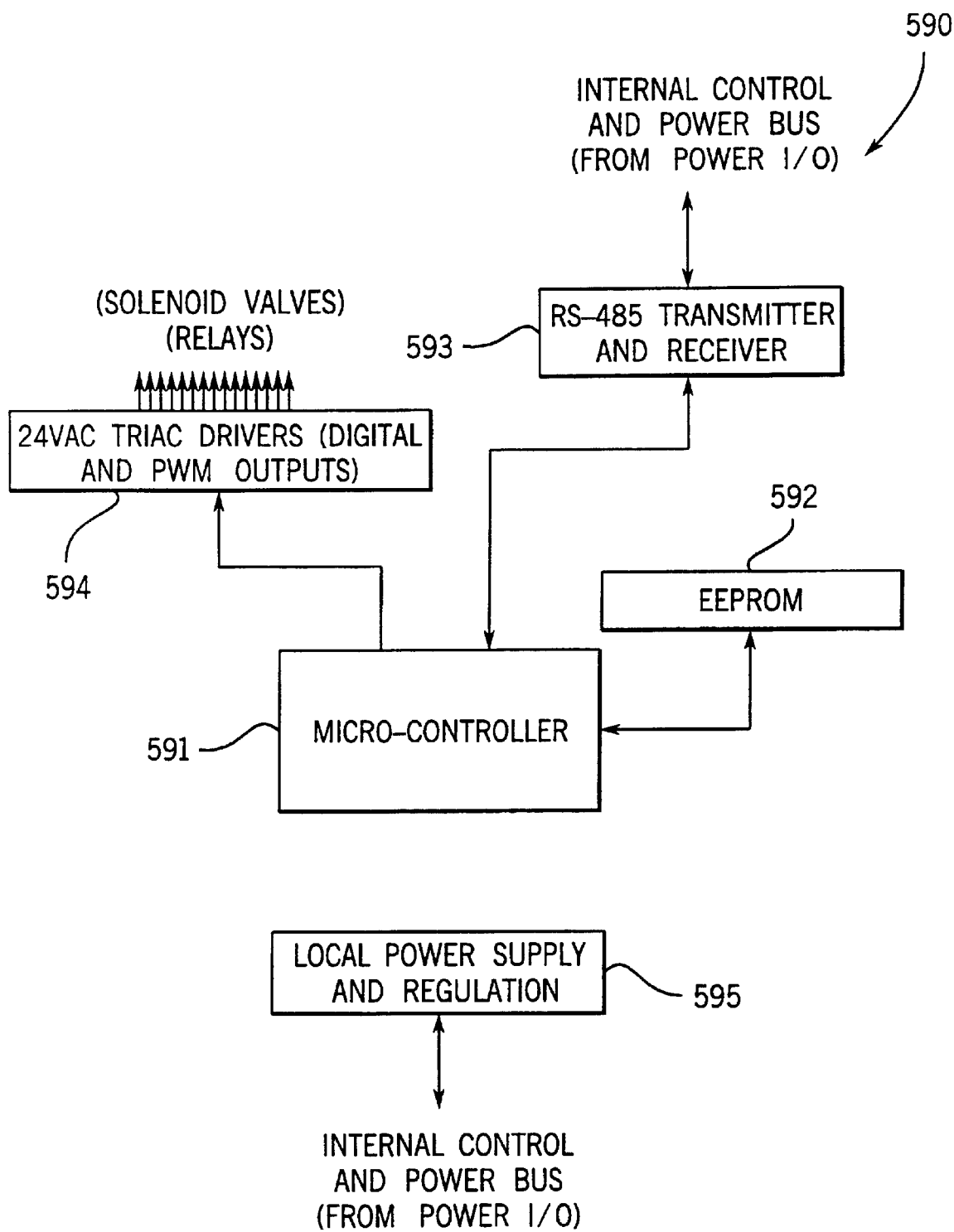
FIG. 25 is a block diagram of a clean-in-place ("CIP") board employed in the system for controlling the operation of the machine during clean-in-place operations.

The clean in place (CIP) board 590 also operates as a slave board under control of the main control board 555, and may be mounted as a daughter board on the main control board 555. Turning now to FIG. 25, like the power I/O board and other slave boards, the CIP board may also mount a separate micro-controller 591 having its own onboard ROM for an application program, RAM and a UART for communications purposes. Sample micro-controller types have already been provided above and the Motorolla HC 11 is also an excellent choice for this operational mode of the system. On the board (if desired) and external to the particular micro controller chosen, is an EEPROM 592, which may be employed to store calibration, setup and configuration data. External to the UART is an RS-485 transmitter and receiver 593 that allows the system to interface with RS-485 devices on the power I/O board and internal control and power bus. Inasmuch as the function of the CIP board is to facilitate clean in place of the machine, also connected to the digital I/O of the micro controller 591 are TRIAC driver circuits 594 that switch the control voltage (e.g., 24V A.C.) to the various contactors, relays and valves in the system, and supply, as necessary, a pulse-width-modulated (PWM) output to control the mode of operation described heretofore in the section of this specification entitled "Clean-In-Place Mode (CIP)". As is conventional, the CIP board may mount the local power supply and regulation module 595 which receives power from the power I/O board and supplies local power for the CIP board.

Figure 26:
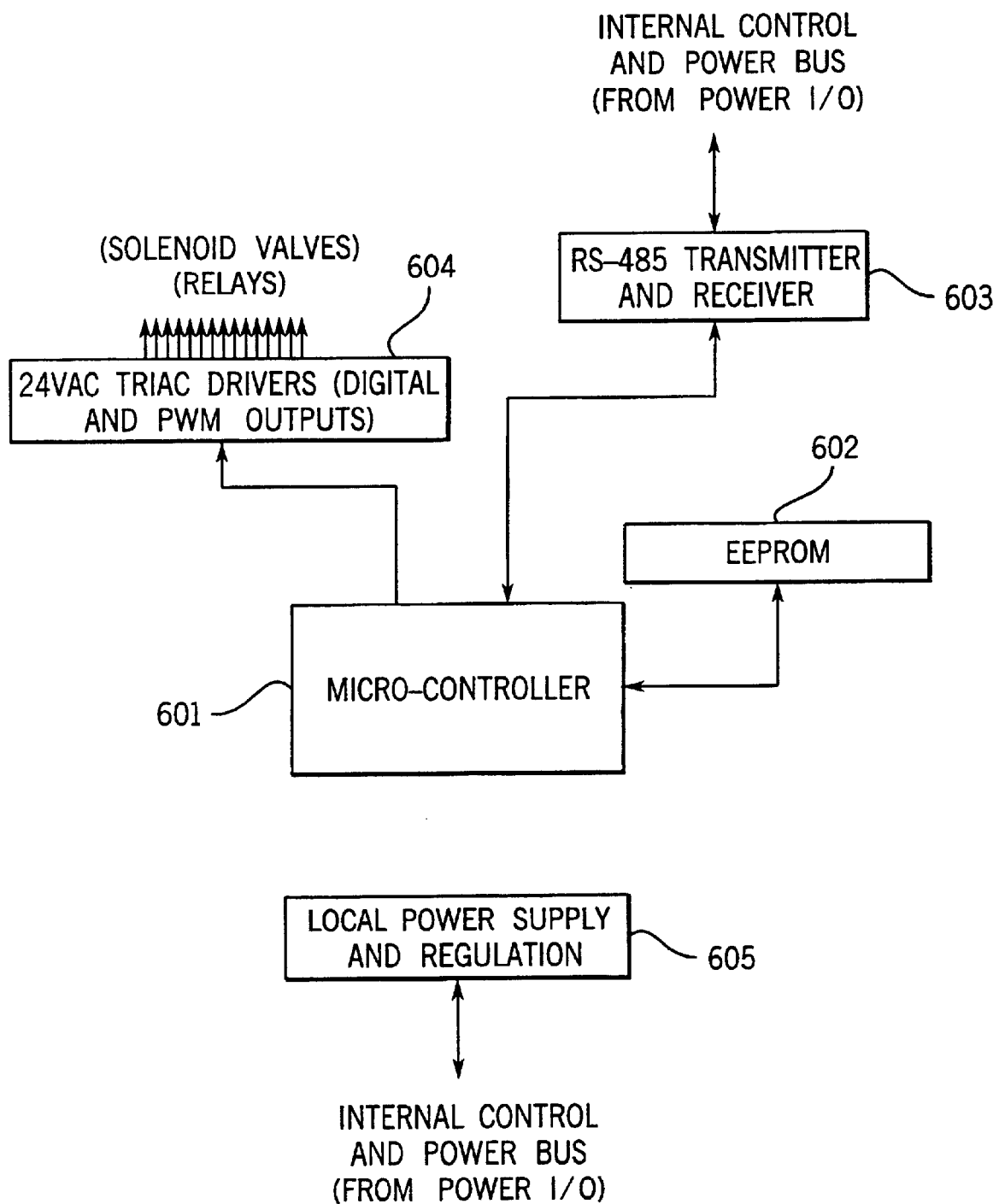
FIG. 26 is a block diagram of the refrigeration mix control board utilized for maintaining the temperature, humidity and the like for the mix cabinet.

Turning now to FIG. 26, the refrigerated control board 600 also operates as a slave board under control of the main control board 555, and, like the other boards, may be mounted as a daughter board on the main control board 555. However, once again, it is preferably of a distributed control architecture where the processor is situated close to the actuator or sensor that it controls. Like the power I/O board and other slave boards, the refrigerated control board 600 may also mount a separate micro-controller 601 having its own onboard ROM for an application program, RAM and a UART for communications purposes. Sample micro-controller manufacturers and types have already been provided above and once again the Motorolla HC 11 is an excellent choice for this operational mode of the system. On the board (if desired) and external to the particular micro controller chosen, is an EEPROM 602, which may be employed to store calibration, setup and configuration data. External to the UART is an RS-485 transmitter and receiver 603 that allows the system to interface with RS-485 devices on the power I/O board and internal control and power bus. Inasmuch as the function of the refrigeration and control board is to facilitate proper operation of the refrigeration system, also connected to the digital I/O of the micro controller 591 are TRIAC driver circuits 604 that switch the control voltage (e.g., 24V A.C.) to the various contactors, relays and valves in the system, and supply, as necessary, a pulse-width-modulated (PWM) output to control the operation described of the machine in refrigerating, not only the finished product but maintenance of the product mix in the mix cabinet 43. This means that the refrigerated control board must control the passive refrigeration and refrigerant control for proper operation of the temperature control in the mix cabinet 43. As is conventional, the refrigeration control board 600 may mount the local power supply and regulation module 605 which receives power from the power I/O board and supplies local power for the refrigeration control board.

Figure 27:
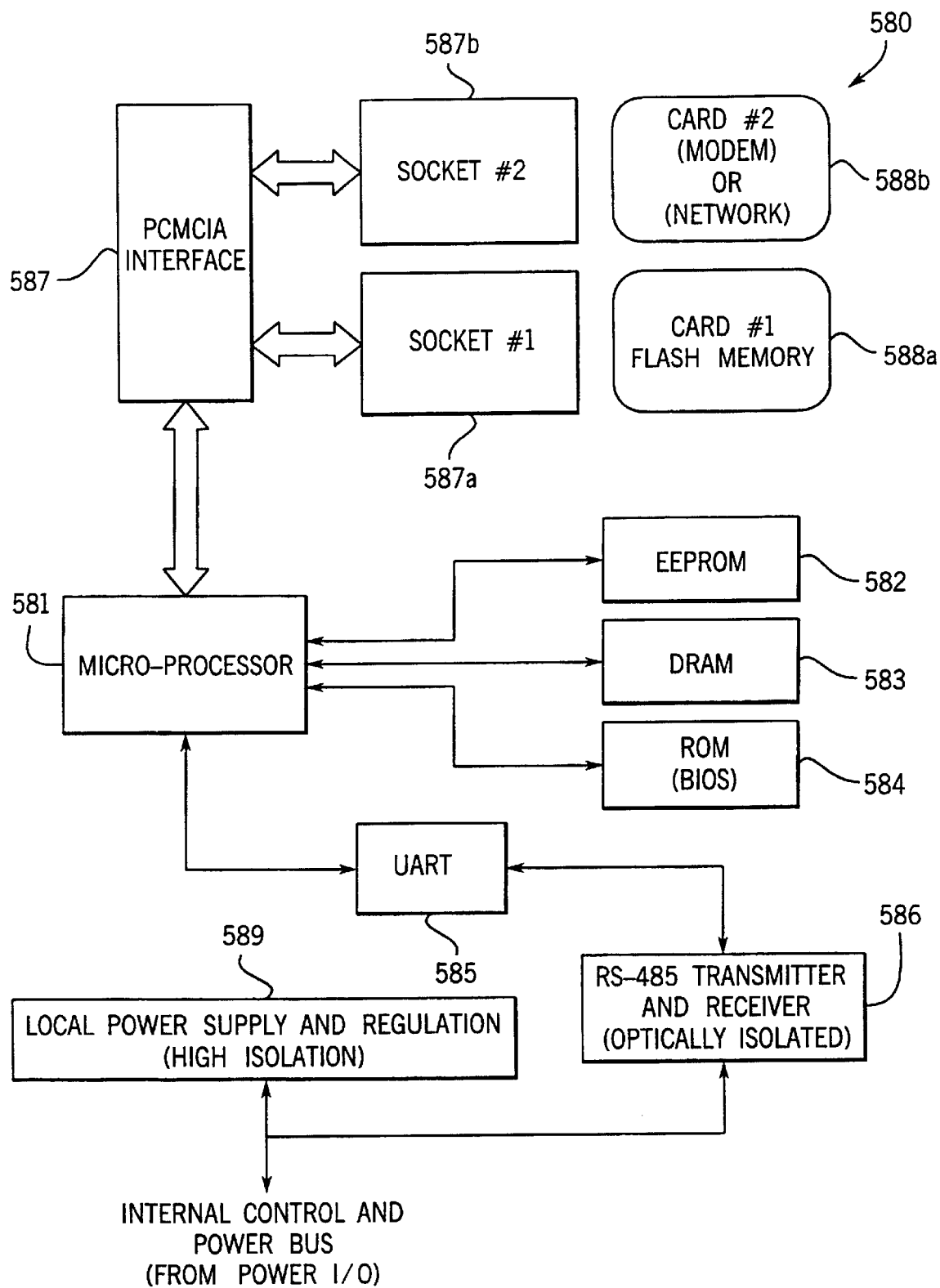
FIG. 27 is a block diagram of the Data Logger and Communications Board which permits and facilitates, as its name implies, data recordation and communications between the control system and the outside world.

Turning now to FIG. 27, the data logging function is meant to be helpful in maintaining the machine by monitoring its usage so that long term availability, mean-time-between failure (MTBF) and product use and waste may be monitored and acted upon when propitious to do so. As with the other daughter or slave boards connectable to the main board 555, once again, this board is preferably of a distributed control architecture type where the processor is situated close to the actuator or sensor that it controls. As with the boards previously described, the heart of the data logger (and communications) board 580 may be a micro-controller or micro-processor 581. In the illustrated instance a microprocessor, for example of the 80486 class manufactured by Intel Corporation, may be employed. Coupled to the microprocessor 581 is suitable ROM, in the present instance an EEPROM 592 which may store the application program for the micro-processor. As is conventional, dynamic random access memory, DRAM 583 and standard BIOS (basic input/output scheme) ROM 584 is also connected for providing active memory and stored system start up memory for the data logger board 580. A UART 585 couples the microprocessor 581 to an optically isolated RS-485 transmitter and receiver 586 for "talking" with the main board 555. Recording and communication of data and events externally of the machine may be accomplished in any convenient manner, in the illustrated instance by providing a PCMCIA interface 587 which, through on-board sockets 587*a*, 587*b* permits plug in of a first card 588*a* (for example of flash memory), or for a second card 588*b* for insertion of a networking or modem card. As shown, also located on the logger board 580 is a local power supply and voltage regulation module 589 which is also coupled to the internal control and power bus from the power I/O board 570.

Thus, the present invention provides numerous advantages with the closed refrigeration system including a novel door and valve assembly for ensuring good locking action and closing off of the freezing cylinder which not only ensures interlocking with and by the product dispenser, inadvertent displacement of the door is inhibited. Moreover, the cover design in association with the door provides prevention of condensation. The novel alignment features and sealing arrangement for the door give further advantages for capturing the door against the rim of the freezing cylinder. Additionally, the rolling diaphragm construction of the product dispensing apparatus allows for maintenance of a cleaner machine.

While the invention has been described with a certain degree of particularity, it should be realized that the description and drawings are meant to be in the way of example only, and numerous changes in construction and operation may be had without detracting or altering the invention as hereinafter claimed.

What is claimed is:

1. A door assembly for a freezing chamber, said freezing chamber comprising a tube having a rim at one end thereof, said door assembly comprising;
    a door including alignment lugs on one of said door and said rim and apertures, intended for reception of said lugs on the other of said door and rim, to insure proper alignment of said door with said rim;
    an annular projection on one of said door and rim and an annular receptacle, aligned with said annular projection when the door is in position in mating engagement with said rim, on the other of said door and rim; and a Z-shaped, in cross section, seal fittable in said receptacle to receive said annular projection and to provide a seal therewith; and
    a cover member, said cover member having an exterior and interior portion, said interior portion having a door engagement portion to cause pressing engagement between said door and said rim, and a locking collar on the exterior portion of said cover for locking engagement with the rim of said freezing tube, the major portion of said interior portion of said cover being spaced from said door to form an insulating space.

2. A door assembly for a freezing chamber in accordance with claim 1 including a depending lip on said Z-shaped seal forming, with said annular projection, an axial seal.

3. A door assembly for a freezing chamber in accordance with claim 2, including a second lip on said Z-shaped seal forming another axial seal with said projection.

4. A door assembly for a freezing chamber in accordance with claim 3, including a connecting portion between said lips, forming with said projection a radial seal.

5. A door assembly for a freezing chamber in accordance with claim 1 wherein said alignment lugs are of different size and mate only with correspondingly dimensioned alignment apertures.

6. A door assembly for a freezing chamber in accordance with claim 1 including a passageway in said door for receiving product from said freezing cylinder, and a product outlet from said door;
    a receptacle for insertion into said door in a path aligned with said product outlet, and a product dispensing valve in said receptacle;
    and an aperture in said cover aligned with said receptacle, and engageable thereby to retain and lock said cover to said door.

7. A door assembly for a freezing chamber in accordance with claim 2 including a passageway in said door for receiving product from said freezing cylinder, and a product outlet from said door;
    a receptacle for insertion into said door in a path aligned with said product outlet, and a product dispensing valve in said receptacle;
    and an aperture in said cover aligned with said receptacle, and engageable thereby to retain and lock said cover to said door.

8. A door assembly for a freezing chamber in accordance with claim 7 wherein said alignment lugs are of different size and mate only with correspondingly dimensioned alignment apertures.

9. A door assembly for a freezing chamber in accordance with claim 6, wherein said dispensing valve includes a piston and a seat for said piston in said door in said product outlet; and a rolling diaphragm carried by said piston to seal the receptacle from product whether the piston is either in a position to dispense product or is sealing the product outlet.

10. A dispensing valve assembly for dispensing a softserve product from a refrigeration machine, said valve assembly comprising;
    a receptacle and a cup shaped insert, below said receptacle, said insert having a skirt,
    a shaft extending through said receptacle and insert and guided thereby;
    a head positioned on the extended end of said shaft and captured thereby and a diaphragm connected to said head end and circumscribing said skirt of said insert, whereby when said shaft reciprocates, said diaphragm rolls inwardly of the skirt of said insert thereby inhibiting product mix from entering the receptacle and insert through which said shaft portion of said valve extends;
    a door assembly for said softserve freezing machine, said door assembly including a cover; an aperture in said cover for receiving a valve body of said dispensing valve assembly, and means associated with said valve assembly for locking said valve assembly to said cover; and
    a door coupled to said cover and dispensing valve for coupling to a freezing cylinder of said softserve machine.

11. A dispensing valve assembly for dispensing a softserve product from a refrigeration machine in accordance with claim 10 including a product draw handle associated with the shaft for effecting reciprocation thereof.

12. A dispensing valve assembly for dispensing a softserve product from a refrigeration machine in accordance with claim 10, including one of alignment lugs and apertures on said door for mating alignment with one of mating apertures or alignment lugs on the freezing chamber.

13. A dispensing valve assembly for dispensing a soft-serve product from a refrigeration machine in accordance with claim 12 wherein said alignment lugs are of different size and mate only with correspondingly dimensioned alignment apertures.

14. A combination door and semi-frozen food product dispensing valve assembly for a softserve refrigeration machine;

said machine including a closed refrigeration system with a recirculating refrigerant path, said system including a condenser in said path having a liquid refrigerant output, a throttling expansion valve for changing state of liquid refrigerant to a gas and an evaporator having an inlet and an outlet, all serially connected in said refrigerant path; said evaporator including a freezing chamber therein for receiving product mix and dispensing semi-frozen product through an outlet end of said freezing chamber;

a circumferentially extending rim on said freezing chamber, and a door in said combination door and valve assembly for mating in sealing engagement with said rim;

a cover associated with said door and a locking ring associated with said cover, and means on said locking ring for engaging said rim and urging said door against said rim in sealing engagement therewith;

a valve assembly for engagement in said door assembly with said door, through said cover, locking said door to said rim inhibiting displacement of said cover;

a frozen product passageway in said door assembly and said valve assembly, and a dispensing valve shaft in said valve assembly movable between a first position closing off said passageway for product and to a second position opening said passageway to permit product to pass therethrough.

15. A combination door and semi-frozen food product dispensing valve for a softserve refrigeration machine in accordance with claim 14 wherein said valve assembly includes;

a receptacle and a cup shaped insert, below said receptacle, said insert having a skirt, said shaft extending through said receptacle and insert and guided thereby;

a head positioned on the extended end of said shaft and captured thereby and a diaphragm connected to said head end and circumscribing said skirt of said insert, whereby when said shaft moves between its first and second positions, said diaphragm rolls inwardly of the skirt of said insert thereby inhibiting product mix from entering the receptacle and insert through which said shaft extends.

16. A combination door and semi-frozen food product dispensing valve for a softserve refrigeration machine in accordance with claim 15 including a product draw handle associated with the shaft for effecting reciprocation thereof between said first and second positions.

17. A combination door and semi-frozen food product dispensing valve for a softserve refrigeration machine in accordance with claim 16 including a biasing spring for restoring said shaft to its rest position.

18. A combination door and semi-frozen food product dispensing valve for a softserve refrigeration machine in accordance with claim 15 including a circumferentially extending recess in one of said door and rim, a mating projection on the other of said door and rim, and a compressible seal intermediate said projection and said recess to effect a seal between said door and said rim.

19. A combination door and semi-frozen food product dispensing valve for a softserve refrigeration machine in accordance with claim 18 herein said seal is Z-shaped in cross section.

20. A combination door and semi-frozen food product dispensing valve for a softserve refrigeration machine in accordance with claim 14 wherein said locking ring is integral with said cover, and at least a portion of said cover is spaced from said valve assembly to form an insulator therebetween.

* * * * *